(12) United States Patent
Bhattacharya

(10) Patent No.: US 8,761,089 B2
(45) Date of Patent: Jun. 24, 2014

(54) FRAME ACKNOWLEDGMENT IN A COMMUNICATION NETWORK

(75) Inventor: Sabyasachi Bhattacharya, Bangalore (IN)

(73) Assignee: Brillio, LLC, New Jersey ( * ) Notice: Subject to any disclaimer, the term of this patent is extended or adjusted under 35 U.S.C. 154(b) by 193 days.

(21) Appl. No.: 13/310,797

(22) Filed: Dec. 5, 2011

(65) Prior Publication Data
US 2013/0094437 A1 Apr. 18, 2013

(30) Foreign Application Priority Data

Oct. 18, 2011 (IN) .......................... 3570/CHE/2011

(51) Int. Cl.
H04L 1/18 (2006.01)
H04L 12/56 (2006.01)
H04L 1/16 (2006.01)

(52) U.S. Cl.
CPC ............. *H04L 1/1614* (2013.01); *H04L 1/1621* (2013.01); *H04L 1/1607* (2013.01); *H04L 1/1829* (2013.01); *H04L 1/1848* (2013.01)
USPC ............ 370/328; 370/389; 714/748; 714/749

(58) Field of Classification Search
CPC .............................. H04W 28/04; H04L 1/0079
USPC ................... 370/389; 710/300; 714/748–749
See application file for complete search history.

(56) References Cited

U.S. PATENT DOCUMENTS

| | | | |
|---|---|---|---|
| 4,422,171 A * | 12/1983 | Wortley et al. ............... | 714/748 |
| 6,367,045 B1 | 4/2002 | Khan et al. | |
| 7,385,976 B2 | 6/2008 | Gu et al. | |
| 7,441,061 B2 * | 10/2008 | Gilligan ........................ | 710/300 |
| 2006/0034274 A1* | 2/2006 | Kakani et al. ................. | 370/389 |
| 2006/0034277 A1* | 2/2006 | Jang et al. ..................... | 370/389 |
| 2006/0048034 A1* | 3/2006 | Cho .............................. | 714/749 |
| 2007/0162813 A1* | 7/2007 | Nakashima ................... | 714/749 |

FOREIGN PATENT DOCUMENTS

| | | | |
|---|---|---|---|
| KR | WO2006022484 A1 | | 3/2006 |
| WO | WO0103359 A1 | | 1/2001 |

* cited by examiner

*Primary Examiner* — Jung Park
*Assistant Examiner* — Chuong M Nguyen
(74) *Attorney, Agent, or Firm* — Ash Tankha; Lipton, Weinberger & Husick

(57) ABSTRACT

A method and system for acknowledging multiple frames in a communication network is provided. A receiver detects transmission of frames from a transmitter. The receiver determines a format for an acknowledgment frame comprising multiple bytes, from multiple frame acknowledgment formats for reporting status of reception of the frames by the receiver. The receiver reports the status of reception of the frames by encoding a distance between a number of frames between two successive correctly received frames, between two successive unsuccessfully received frames, between a correctly received frame and a successive unsuccessfully received frame, or between an unsuccessfully received frame and a successive correctly received frame, in the acknowledgment frame. One or more of the frame acknowledgment formats are configured to generate the acknowledgment frame for acknowledging the frames using a decreased number of bytes. The receiver generates the acknowledgment frame in the determined format for acknowledging the frames.

30 Claims, 13 Drawing Sheets

| SIZE OF BITMAP (BYTES) | THRESHOLD | BITMAP VALUE (DECIMAL) | NO. OF 1'S IN THE BITMAP | IS THE THIRD FRAME ACKNOWLEDGMENT FORMAT USED? | SIZE OF THE BA BITMAP FIELD (BYTES) | BYTES SAVED | PERCENTAGE REDUCTION IN THE SIZE OF THE BA BITMAP FIELD |
|---|---|---|---|---|---|---|---|
| 8 | 7 | 21 | 3 | Yes | 3 | 5 | 62.5 |
| 16 | 16 | 66 | 2 | Yes | 2 | 14 | 87.5 |
| 8 | 7 | 56 | 3 | Yes | 3 | 5 | 62.5 |
| 16 | 16 | 143 | 5 | Yes | 5 | 11 | 68.75 |

FIG. 9A

| SIZE OF THE BITMAP (BYTES) | BITMAP VALUE | SIZE OF THE BA BITMAP FIELD (BYTES) | BYTES SAVED | PERCENTAGE REDUCTION IN THE SIZE OF THE BA BITMAP FIELD |
|---|---|---|---|---|
| 8 | 0x8000000000000000 | 0 | 8 | 100 % |
| 8 | 0x7fffffffffffffff | 2 | 6 | 75% |
| 8 | 0x01ffffffffffff00 | 3 | 5 | 60% |

FIG. 9B

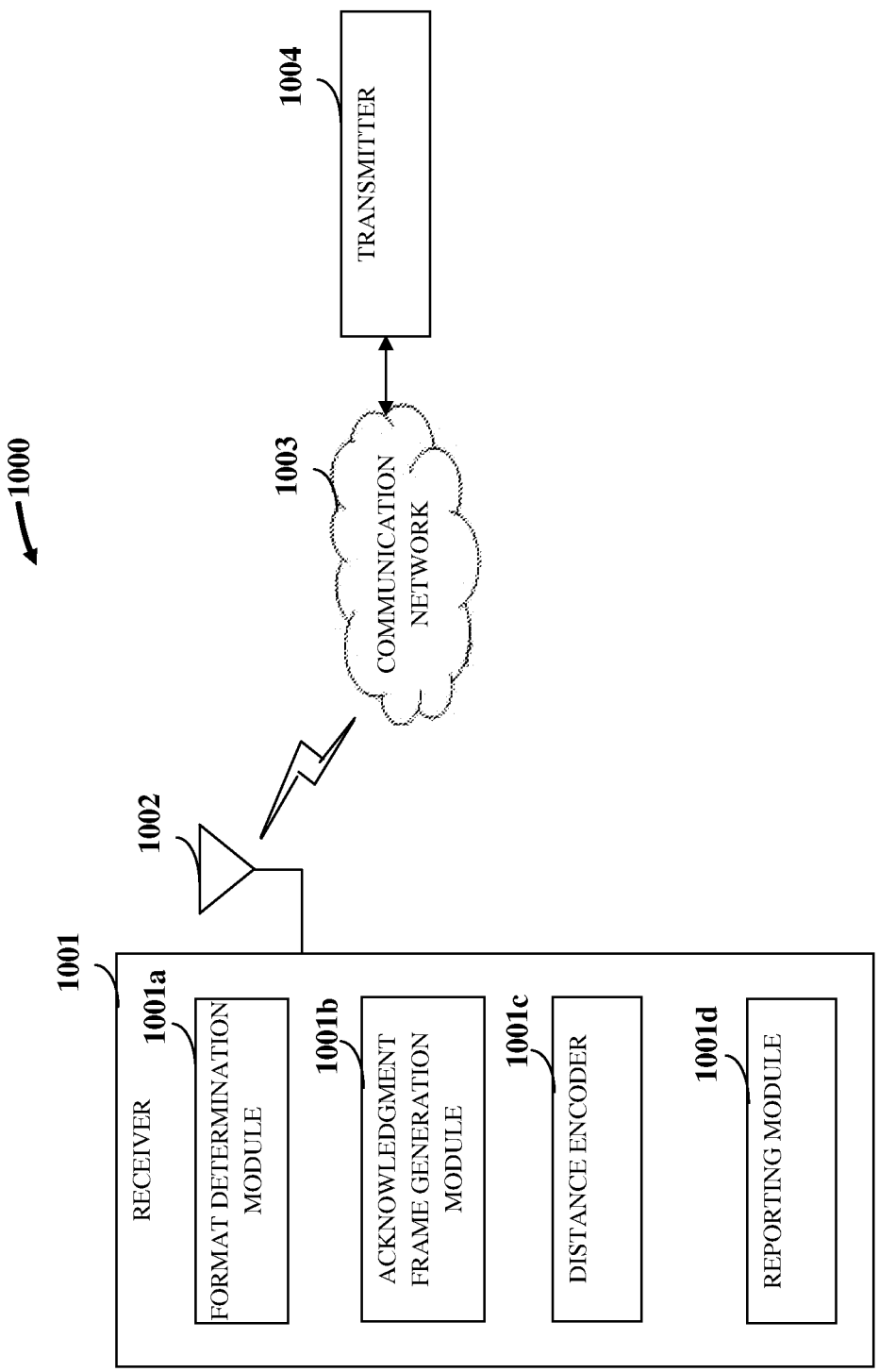

FRAME ACKNOWLEDGMENT IN A COMMUNICATION NETWORK

CROSS REFERENCE TO RELATED APPLICATIONS

This application claims the benefit of non-provisional patent application number 3570/CHE/2011 titled "Frame Acknowledgment In A Communication Network", filed on Oct. 18, 2011 in the Indian Patent Office.

The specification of the above referenced patent application is incorporated herein by reference in its entirety.

BACKGROUND

An acknowledgment mechanism between a transmitter and a receiver is often required for ensuring reliability of a communication link between the transmitter and the receiver. That is, when the receiver receives frames comprising bytes of data transmitted by the transmitter, the receiver transmits an acknowledgment message to the transmitter, acknowledging the reception of the frames. However, transmission of acknowledgment messages requires additional resources and reduces throughput of the communication link which deters communication systems from implementing the acknowledgment mechanism, thereby compromising the quality of the communication link. A communication standard, for example, the Institute of Electrical and Electronics Engineers (IEEE) 802.11 standard implements a frame acknowledgment and retransmission mechanism based on a required quality of service (QoS). Acknowledgment messages are transmitted only if a high QoS is required. Hence, there is a need for an efficient acknowledgment mechanism that requires a decreased number of bytes for acknowledging the reception of frames and which can therefore be used to ensure reliability in the communication link at all times regardless of the required QoS.

The IEEE 802.11n standard uses an acknowledgment message with a compressed block acknowledgment (BA) bitmap, where the maximum number of frames that can be acknowledged by the acknowledgment message is equal to the length, in number of bits, of the compressed BA bitmap. For example, if the length of the compressed BA bitmap is 64 bits, the maximum number of frames that can be acknowledged is 64 frames. This standard, therefore, requires the receiver to transmit multiple acknowledgment messages to the transmitter to completely acknowledge the reception of the frames from the transmitter. For a more effective usage of the available bandwidth, there is a need for an acknowledgment mechanism that acknowledges an increased number of frames in a single acknowledgment message, thereby reducing the number of acknowledgment messages required for the acknowledgment.

Hence, there is a long felt but unresolved need for a method and system that acknowledges an increased number of frames in a single acknowledgment message using a few bytes for effectively utilizing the available bandwidth, and that ensures backward compatibility.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein addresses the above stated need for acknowledging multiple frames in a communication network using a few bytes for effectively utilizing the available bandwidth. The method and system disclosed herein acknowledges an increased number of frames in a single acknowledgment message using a few bytes, thereby resulting in higher efficiency and effective usage of the available bandwidth. The method and system disclosed herein also ensures backward compatibility by allowing acknowledgment of frames using an acknowledgment frame in a conventional standard format, in addition to allowing acknowledgment of frames using an acknowledgment frame in one of multiple frame acknowledgment formats disclosed herein.

In the method and system disclosed herein, a receiver detects transmission of frames from a transmitter in the communication network. The receiver determines a format for an acknowledgment frame comprising multiple bytes, from multiple frame acknowledgment formats for reporting the status of reception of the frames. The receiver reports the status of the reception of the frames, for example, by encoding a distance between a number of frames between two successive correctly received frames, between two successive unsuccessfully received frames, between a correctly received frame and a successive unsuccessfully received frame, or between an unsuccessfully received frame and a successive correctly received frame, in the acknowledgment frame. One or more of the frame acknowledgment formats are configured to generate the acknowledgment frame for acknowledging the frames using a decreased number of bytes.

The receiver generates the acknowledgment frame in the determined format for acknowledging the frames. The generated acknowledgment frame comprises a control field and an information field. The control field comprises multiple bits for indicating the determined format of the acknowledgment frame. The control field further comprises a length subfield for indicating the status of correct reception of the frames by the receiver or a number of frames acknowledged by the receiver. The information field comprises a starting sequence control field and a bitmap field. The starting sequence control field indicates a sequence number of the frame that references initiation of the reporting of the status of the reception of the frames. The bitmap field indicates the status of the reception of the frames.

The receiver determines the correctness of reception of the frames for the determination of the format for the acknowledgment frame. In an embodiment, the receiver selects a first frame acknowledgment format for the acknowledgment frame when each of the frames is correctly received by the receiver. The control field of the acknowledgment frame in the first frame acknowledgment format comprises a length subfield that indicates status of correct reception of the frames by the receiver as zero. The information field of the acknowledgment frame in the first frame acknowledgment format comprises only the starting sequence control field that indicates that each of the frames with a sequence number less than a sequence number indicated in the starting sequence control field is correctly received by the receiver.

In another embodiment, the receiver selects a second frame acknowledgment format for the acknowledgment frame when each of the frames with a sequence number greater than or equal to a sequence number indicated in the starting sequence control field is unsuccessfully received by the receiver. The control field of the acknowledgment frame in the second frame acknowledgment format comprises a length subfield that indicates a number of unsuccessfully received frames that have a sequence number greater than a sequence number indicated in the starting sequence control field. That is, the length subfield of the control field of the acknowledgment frame in the second frame acknowledgment format indicates that the number of frames acknowledged by the receiver is equal to a number of unsuccessfully received frames that have a sequence number greater than the sequence number indicated in the starting sequence control field, excluding the frame indicated in the starting sequence control field. The information field of the acknowledgment frame in the second frame acknowledgment format comprises only the starting sequence control field.

In another embodiment, the receiver determines a threshold based on a number of frames for which the receiver needs to report the status of the reception. In this embodiment, the receiver determines a number of correctly received frames and a number of unsuccessfully received frames, when one or more of the frames are correctly received by the receiver or when one or more of the frames are unsuccessfully received by the receiver. The receiver then compares the determined number of correctly received frames and the determined number of unsuccessfully received frames with the determined threshold and selects, for example, a third frame acknowledgment format for the acknowledgment frame, when the determined number of correctly received frames or the determined number of unsuccessfully received frames is less than or equal to the determined threshold.

The third frame acknowledgment format for the acknowledgment frame comprises multiple repeatable 7-bit structures. Each of the 7-bit structures comprises a 5-bit subfield, a first 1-bit flag field, and a second 1-bit flag field. In an embodiment, the receiver reports the unsuccessfully received frames in the acknowledgment frame in the third frame acknowledgment format, when the determined number of unsuccessfully received frames is less than or equal to the threshold. In another embodiment, the receiver reports the correctly received frames in the acknowledgment frame in the third frame acknowledgment format, when the determined number of correctly received frames is less than or equal to the threshold.

In another embodiment, the receiver determines the format for the acknowledgment frame, for example, by determining a number of correctly received frames and a number of unsuccessfully received frames, when one or more of the frames are correctly received by the receiver or when one or more of the frames are unsuccessfully received by the receiver. The receiver compares the determined number of correctly received frames and the determined number of unsuccessfully received frames with a determined threshold. The receiver then determines a number of bytes required for the reporting of the status of the reception of the frames when using a fourth frame acknowledgment format for the acknowledgment frame, when the determined number of correctly received frames or the determined number of unsuccessfully received frames is greater than the threshold. The receiver compares the number of bytes determined when using the fourth frame acknowledgment format with a number of bytes required for reporting the status of the reception of the frames when using a standard format, for example, a compressed block acknowledgment bitmap for the acknowledgment frame. The receiver selects the fourth frame acknowledgment format or the standard format for the generation of the acknowledgment frame for acknowledging the frames using a decreased number of bytes. The fourth frame acknowledgment format for the acknowledgment frame comprises multiple repeatable 8-bit structures. Each of the 8-bit structures comprises a 5-bit subfield, a first 1-bit flag field, a second 1-bit flag field, and a third 1-bit flag field.

In an embodiment, the receiver acknowledges multiple frames with a decreased number of bytes using the acknowledgment frame in the fourth frame acknowledgment format, for example, by determining a first distance between a current frame and a successive correctly received frame. The current frame is at a reference point from where the receiver determines the first distance and a second distance. The receiver determines the second distance between the current frame and a successive unsuccessfully received frame. The receiver determines the greater distance between the first distance and the second distance, and encodes the determined greater distance in the acknowledgment frame in the fourth frame acknowledgment format. The receiver successively changes the reference point to a point one more than the determined greater distance away from the reference point for determining the first distance and the second distance from the successively changed reference point. A frame at the successively changed reference point is represented as the current frame. That is, the receiver determines the first distance and the second distance from the next reference point which is one more than the first distance or one more than the second distance away from the previous reference point, depending on whether the first distance or the second distance is the determined greater distance. The frame at the next reference point is now the current frame from which the receiver determines the next first distance and the next second distance.

In an embodiment, the receiver terminates the reporting of the status of the reception of the frames, when the encoded greater distance is the determined first distance and each the frames subsequent to the successive correctly received frame is a correctly received frame. In another embodiment, the receiver terminates the reporting of the status of the reception of the frames, when the encoded greater distance is the determined second distance and each of the frames subsequent to the successive unsuccessfully received frame is an unsuccessfully received frame.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 9A exemplarily illustrates a table showing the number of bytes saved for different sizes of bitmaps and different bitmap values when a third frame acknowledgment format is selected for the acknowledgment frame.

FIG. 9B exemplarily illustrates a table showing the number of bytes saved for different sizes of bitmaps and different bitmap values when a fourth frame acknowledgment format is selected for the acknowledgment frame.

FIG. 10 exemplarily illustrates a system for acknowledging multiple frames in a communication network.

DETAILED DESCRIPTION OF THE INVENTION

Figure 1:
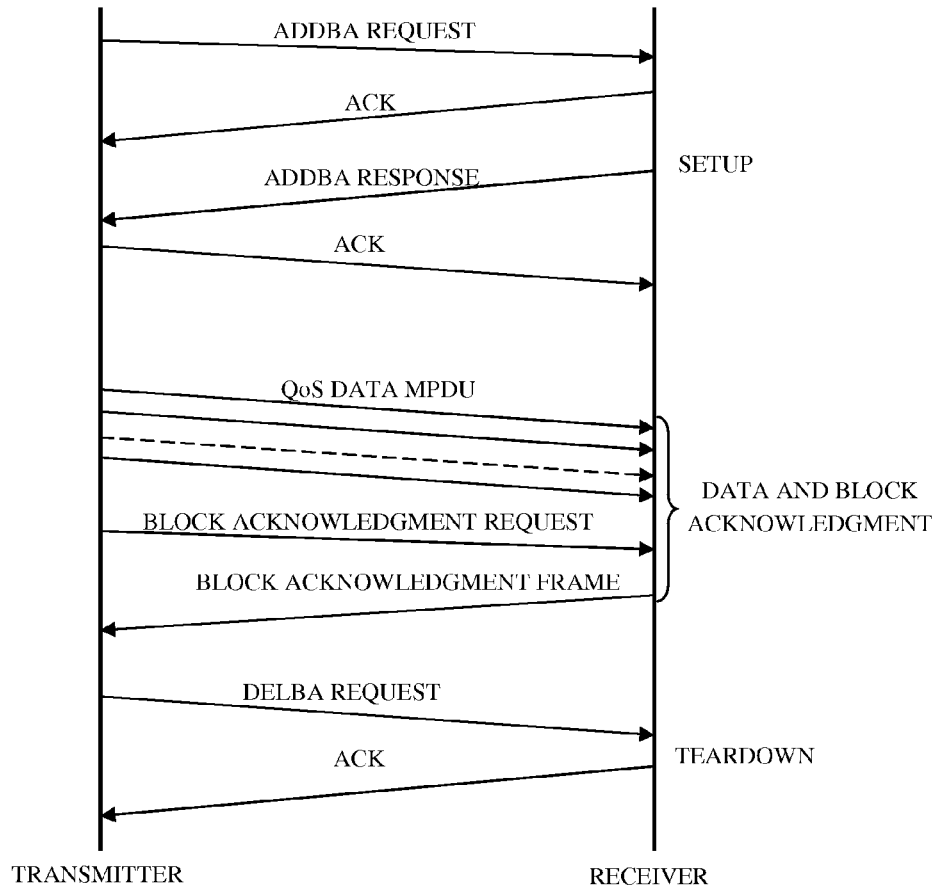
FIG. 1 exemplarily illustrates an acknowledgment mechanism for acknowledging quality of service data media access control protocol data units in a communication network.

FIG. 1 exemplarily illustrates an acknowledgment mechanism for acknowledging quality of service (QoS) data media access control (MAC) protocol data units (MPDUs) in a communication network that implements, for example, Wi-Fi™ of the Wireless Ethernet Compatibility Alliance, Inc. The Wi-Fi™ network comprises multiple different IEEE 802.11 MAC layer conformant stations and physical layer conformant stations. A station can act as a transmitter and/or a receiver. The QoS stations support a block acknowledgment mechanism. The block acknowledgment mechanism is implemented in the MAC layer of the Wi-Fi™ stack. Block acknowledgment comprises a setup phase and a teardown phase. In the setup phase, the transmitter and the receiver exchange an add block acknowledgment (ADDBA) request message and an ADDBA response message respectively, in order to initialize the block acknowledgment mechanism exemplarily illustrated in FIG. 1. After initialization, the transmitter transmits the QoS data MPDUs to the receiver. The transmitter, by transmitting a block acknowledgment request to the receiver requests for an acknowledgment status for the QoS data MPDUs from the receiver. The receiver transmits a block acknowledgment frame comprising the acknowledgment status of the QoS data MPDUs back to the transmitter. The generation of the block acknowledgment frame by the receiver is disclosed in the detailed description of FIG. 2, FIG. 4B, and FIGS. 7A-7B. In the teardown phase, the block acknowledgment agreement between the transmitter and the receiver is torn down using a delete block acknowledgment (DELBA) frame. The QoS data MPDUs are transmitted as frames and are herein referred to as "frames".

For the purposes of illustration, the detailed description refers to acknowledging blocks of frames in a Wi-Fi™ network as per the IEEE 802.11n standard; however, the scope of the method and system disclosed herein is not limited to acknowledging blocks of frames in the Wi-Fi™ network as per the IEEE 802.11n standard but may be extended to acknowledging frames in any communication network that implements any communication protocol or standard, for example, third generation partnership project (3GPP) protocols such as general packet radio service (GPRS), enhanced data rates for global system for mobile (GSM) communications evolution (EDGE), wideband code division multiple access (W-CDMA), etc.

Figure 2:
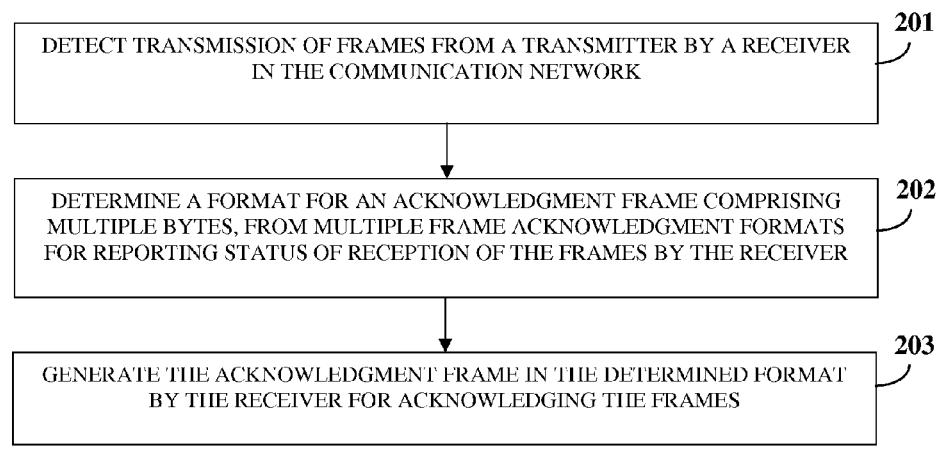
FIG. 2 illustrates a method for acknowledging multiple frames in a communication network.

FIG. 2 illustrates a method for acknowledging multiple frames in a communication network. The frames refer to data packets comprising a specified stream of bits. The communication network is, for example, a wireless local area network (WLAN), a Wi-Fi™ network, a mobile telecommunication network, etc. A mobile telecommunication network is, for example, a GSM network, a code division multiple access (CDMA) network, a third generation (3G) mobile communication network, etc.

A receiver detects 201 transmission of frames from a transmitter in the communication network. The receiver determines 202 a format for an acknowledgment frame comprising multiple bytes, from multiple frame acknowledgment formats for reporting status of reception of the frames. The frame acknowledgment formats comprise, for example, a standard format, a first frame acknowledgment format, a second frame acknowledgment format, a third frame acknowledgment format, and a fourth frame acknowledgment format as disclosed in the detailed description of FIG. 4B, FIGS. 5-6, and FIGS. 7A-7B. One or more of the frame acknowledgment formats are configured to generate the acknowledgment frame for acknowledging the frames using a decreased number of bytes.

The receiver encodes a distance between a number of frames between two successive correctly received frames, between two successive unsuccessfully received frames, between a correctly received frame and a successive unsuccessfully received frame, or between an unsuccessfully received frame and a successive correctly received frame, in the acknowledgment frame, for reporting the status of the reception of the frames. As used herein, the term "unsuccessfully received frames" refers to frames that are lost, corrupt, or incorrectly received.

Figure 4A:
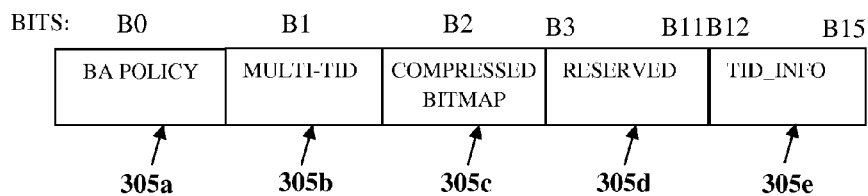
FIG. 4A exemplarily illustrates a structure of a block acknowledgment control field of the acknowledgment frame in the standard format as defined in the IEEE 802.11n standard.
Figure 4B:
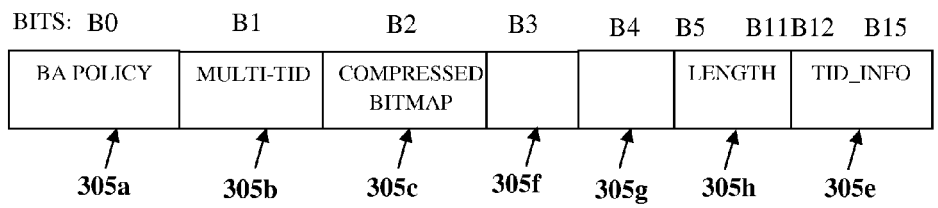
FIG. 4B exemplarily illustrates a structure of a block acknowledgment control field of the acknowledgment frame which is applicable to multiple frame acknowledgment formats.

In an embodiment, the receiver determines correctness of the reception of the frames and selects the first frame acknowledgment format for the acknowledgment frame when each of the frames is correctly received as disclosed in the detailed description of FIG. 4B. In another embodiment, the receiver determines the correctness of the reception of the frames and selects the second frame acknowledgment format for the acknowledgment frame when each of the received frames is unsuccessfully received as disclosed in the detailed description of FIG. 4B. That is, the receiver selects the second frame acknowledgment format for the acknowledgment frame, when each of the frames with a sequence number greater than or equal to a sequence number of one of the frames that references initiation of the reporting of the status of the reception of the frames, is unsuccessfully received by the receiver.

In an embodiment, the receiver determines a threshold, for example, an integer, based on a number of frames for which the receiver needs to report the status of the reception. The threshold is a function of the size of the bitmap, that is, the number of frames for which the receiver needs to report the status of the reception. In an embodiment, the receiver determines the format for the acknowledgment frame by determining a number of correctly received frames and a number of unsuccessfully received frames, when one or more of the frames are correctly received by the receiver or when one or more of the frames are unsuccessfully received by the receiver. The receiver then compares the determined number of correctly received frames and the determined number of unsuccessfully received frames with the determined threshold and selects the third frame acknowledgment format for the acknowledgment frame when the determined number of correctly received frames or the determined number of unsuccessfully received frames is less than or equal to the threshold.

In an embodiment, the receiver determines the format for the acknowledgment frame by determining a number of correctly received frames and a number of unsuccessfully received frames, when one or more of the frames are correctly received by the receiver or when one or more of the frames are unsuccessfully received by the receiver. The receiver compares the determined number of correctly received frames and the determined number of unsuccessfully received frames with the determined threshold. The receiver then determines a number of bytes required for reporting the status of the reception of the frames when using the fourth frame acknowledgment format for the acknowledgment frame, when the determined number of correctly received frames or the determined number of unsuccessfully received frames is greater than the determined threshold. The receiver compares the number of bytes determined when using the fourth frame acknowledgment format with a number of bytes required for reporting the status of the reception of the frames when using the standard format of the frame acknowledgment formats for the acknowledgment frame. The receiver selects the fourth frame acknowledgment format or the standard format for the generation of the acknowledgment frame for acknowledging the frames using a decreased number of bytes.

The receiver generates 203 the acknowledgment frame in the determined format for acknowledging the frames. The acknowledgment frame comprises a control field and an information field as disclosed in the detailed description of FIGS. 3A-3C and FIG. 4A-4B. The receiver transmits the generated acknowledgment frame in the determined format to the transmitter for acknowledging the frames using a decreased number of bytes.

Figure 3A:
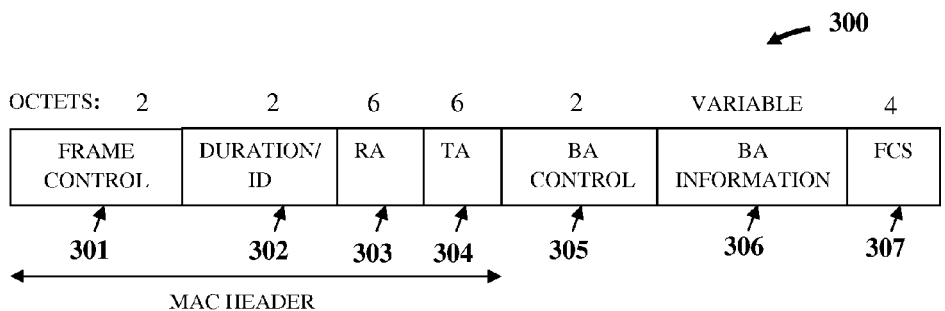
FIG. 3A exemplarily illustrates a structure of an acknowledgment frame in a standard format as defined in the IEEE 802.11n standard.

FIG. 3A exemplarily illustrates a structure of an acknowledgment frame 300 in a standard format as defined in the Institute of Electrical and Electronics Engineers (IEEE) 802.11n standard. The IEEE 802.11n standard uses the standard format with a compressed block acknowledgment (BA) bitmap for the acknowledgment frame 300 for acknowledging frames. The receiver transmits the acknowledgment frame 300 in the standard format to the transmitter for acknowledging the frames. The fields 301, 302, 303, 304, 305, 306, and 307, in the acknowledgment frame 300 occupy a predefined number of octets. An octet refers to a unit of digital information in telecommunications that comprises 8 bits, that is, 1 byte. The acknowledgment frame 300 comprises, for example, a 2-byte long frame control field 301, a 2-byte long duration/identification (ID) field 302, a 6-byte long receiver address (RA) field 303, a 6-byte long transmitter address (TA) field 304, a 2-byte long block acknowledgment (BA) control field 305, a variable length block acknowledgment (BA) information field 306, and a 4-byte long frame check sequence (FCS) field 307. The 2-byte long frame control field 301, the 2-byte long duration/ID field 302, the 6-byte long receiver address (RA) field 303, and the 6-byte long transmitter address (TA) field 304 define a MAC header.

The frame control field 301 contains control information used for defining the type of 802.11 MAC frame, for example, frame type, frame subtype, flags, etc., used in the acknowledgment frame 300. The duration/ID field 302 indicates the time required for the transmission of a frame and the acknowledgment frame 300 associated with the frame in addition to two short inter-frame space (SIFS) intervals. Moreover, the duration/ID field 302 refers to a station identification (ID) in power-save poll messages. The RA field 303 indicates the MAC address of the intended receiver. The TA field 304 indicates the MAC address of the transmitter of the frame. The BA control field 305 of the acknowledgment frame 300 is disclosed in the detailed description of FIGS. 4A-4B. The BA information field 306 is disclosed in the detailed description of FIGS. 3B-3C. The FCS field 307 is a cyclic redundancy check field that allows the receiver of the frame to perform basic error control on the frame.

Figure 3B:
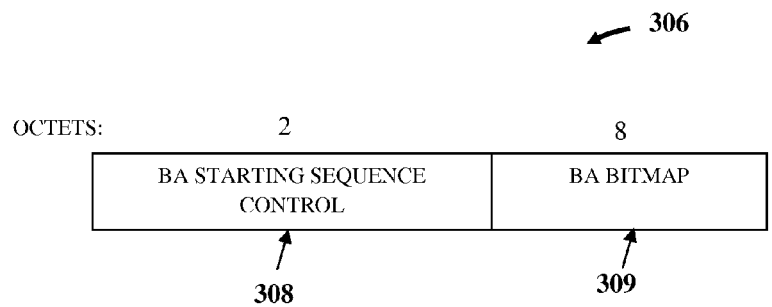
FIG. 3B exemplarily illustrates a structure of a block acknowledgment information field of the acknowledgment frame in the standard format as defined in the IEEE 802.11n standard.

FIG. 3B exemplarily illustrates a structure of the block acknowledgment (BA) information field 306 of the acknowledgment frame 300, exemplarily illustrated in FIG. 3A, in the standard format as defined in the IEEE 802.11n standard. The BA information field 306 comprises, for example, a 2-byte long block acknowledgment (BA) starting sequence control field 308 and an 8-byte long block acknowledgment (BA) bitmap field 309 as disclosed in the detailed description of FIG. 3C.

Figure 3C:
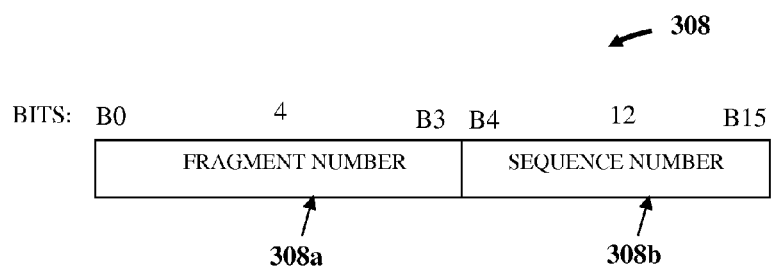
FIG. 3C exemplarily illustrates a structure of a block acknowledgment starting sequence control field of the acknowledgment frame in the standard format as defined in the IEEE 802.11n standard.

FIG. 3C exemplarily illustrates a structure of a block acknowledgment (BA) starting sequence control field 308 of the acknowledgment frame 300, exemplarily illustrated in FIG. 3A, in the standard format as defined in the IEEE 802.11n standard. The BA starting sequence control field 308 of the BA information field 306 of the acknowledgment frame 300 exemplarily illustrated in FIGS. 3A-3B, indicates a sequence number of one of the frames that references initiation of the reporting of the status of the reception of the frames. For example, the BA starting sequence control field 308 indicates the sequence number of a first unsuccessfully received frame. The BA starting sequence control field 308 is two bytes long and comprises a 4-bit fragment number subfield 308a and a 12-bit sequence number subfield 308b. In certain cases, the transmitter transmits the frames as a fragment burst. The fragment number subfield 308a indicates a fragment number assigned to each fragment of a frame within the fragment burst. As the frames are passed to the MAC layer for transmission to the receiver, each of the frames is given a sequence number. The sequence number subfield 308b operates as a modulo-4096 counter of the transmitted frames, which begins with 0 and increments by 1 for each frame handled by the MAC layer.

The BA bitmap field 309 exemplarily illustrated in FIG. 3B indicates the status of reception of the frames. Bit position "n" of the BA bitmap field 309, if set to 1, indicates correct reception of a frame with the sequence number equal to the sequence number indicated in the BA starting sequence control field 308+n. The bit position "n" of the BA bitmap, if set to 0, indicates that a frame with the sequence number equal to the sequence number indicated in the BA starting sequence control field 308+n has been unsuccessfully received. The BA bitmap field 309 of the standard format is reconfigured in the other frame acknowledgment formats to generate the acknowledgment frame 300 for acknowledging the frames using a decreased number of bytes as disclosed in the detailed description of FIG. 4B and FIGS. 5-6.

FIG. 4A exemplarily illustrates a structure of a BA control field 305 of the acknowledgment frame 300, exemplarily illustrated in FIG. 3A, in the standard format as defined by the IEEE 802.11n standard. The BA control field 305 comprises multiple bits that indicate the format of the acknowledgment frame 300. For example, the BA control field 305 of the acknowledgment frame 300 in the standard format is 2-bytes long and comprises bits B0, B1, B2, B3 to B11, and B12 to B15, where B0 represents a block acknowledgment (BA) policy subfield 305a, B1 represents a multi-traffic identifier (TID) subfield 305b, B2 represents a compressed bitmap subfield 305c, B3 to B11 represents a subfield 305d containing reserved bits, and B12 to B15 represent a TID_information (INFO) subfield 305e.

The BA policy subfield 305a specifies whether an immediate acknowledgment is required or not. The multi-TID subfield 305b indicates that multiple traffic elements are in use by a transmitter, when the acknowledgment frame 300 acknowledges traffic from a single transmitter. For example, the transmitter may transmit traffic elements such as video information, electronic mail (email) information, etc. The different traffic elements may have different quality of service requirements. TID refers to a traffic identifier (ID) used to group all frames that require similar quality of service treatment. The multi-TID subfield 305b can be used to indicate that multiple such traffic elements are present in the transmitted frame. Moreover, the multi-TID subfield 305b can be used to indicate that acknowledgment for multiple transmitters, not just multiple traffic elements, is present in the acknowledgment frame 300.

The acknowledgment frame 300 can acknowledge multiple traffic elements with different TIDs. For multiple TIDs in the acknowledgment frame 300, the BA information field 306, exemplarily illustrated in FIGS. 3A-3B, contains multiple instances of TIDs, the BA starting sequence control field 308 exemplarily illustrated in FIGS. 3B-3C, and the BA bitmap field 309 exemplarily illustrated in FIG. 3B, one for each TID. The TID_INFO subfield 305e of the BA control field 305 contains a value one less than the number of instances of TIDs, the BA starting sequence control field 308, and the BA bitmap field 309. For example, a value of 2 in the TID_INFO subfield 305e indicates that 3 instances of TIDs, 3 instances of the BA stating sequence control field 308, and 3 instances of the BA bitmap field 309 are present in the acknowledgment frame 300.

FIG. 4B exemplarily illustrates a structure of the BA control field 305 of the acknowledgment frame 300, exemplarily illustrated in FIG. 3A, which is applicable to multiple frame acknowledgment formats. The BA control field 305 of the acknowledgment frame 300, for example, in the first frame acknowledgment format, the second frame acknowledgment format, the third frame acknowledgment format, and the fourth frame acknowledgment format is 2-bytes long and comprises bits B0, B1, B2, B3, B4, B5 to B11, and B12 to B15, where B0 represents a BA policy subfield 305a, B1 represents a multi-TID subfield 305b, B2 represents a compressed bitmap subfield 305c, subfields 305f and 305g contain the bits B3 and B4 respectively, B5 to B11 represent a length subfield 305h, and B12 to B15 represent a TID_INFO subfield 305e. The length subfield 305h indicates status of correct reception of the frames by the receiver or a number of frames acknowledged by the receiver. For example, the length subfield 305h indicates a number of frames for which the receiver needs to report the status of reception when the first frame acknowledgment format, the second frame acknowledgment format, or the fourth frame acknowledgment format is used. In the acknowledgment frame 300 in the third frame acknowledgment format, bit B5 of the length subfield 305h indicates whether the acknowledgment frame 300 comprises only the BA starting sequence control field 308 exemplarily illustrated in FIGS. 3B-3C, or both the BA starting sequence control field 308 and the BA bitmap field 309 exemplarily illustrated in FIG. 3B, while the bits B6 to B11 are unused.

The bits B2, B3, and B4 in the BA control field 305 of the acknowledgment frame 300 indicate the format selected by the receiver for the acknowledgment frame 300. The bits B2, B3, and B4 are interpreted as follows:

B2=0, B3=0 indicates that the receiver selects an uncompressed BA bitmap for acknowledging the frames.

B2=1, B3=0 indicates that the receiver selects a standard format, that is, a compressed BA bitmap for acknowledging the frames.

B2=0, B3=1 indicates that the receiver selects the third frame acknowledgment format for the acknowledgment frame 300.

B2=1, B3=1 indicates that the receiver selects the first frame acknowledgment format, the second frame acknowledgment format, or the fourth frame acknowledgment format for the acknowledgment frame 300.

In the first frame acknowledgment format, the bits in the BA control field 305 indicate that the BA information field 306, exemplarily illustrated in FIG. 3B, only comprises the BA starting sequence control field 308 and has no additional acknowledgment information. Therefore, the BA information field 306 in the acknowledgment frame 300 in the first frame acknowledgment format comprises only the BA starting sequence control field 308 that indicates that each of the frames with a sequence number less than a sequence number indicated in the BA starting sequence control field 308 is correctly received by the receiver and the number of frames acknowledged in the length subfield 305h of the BA control field 305 is zero.

In the second frame acknowledgment format, the BA information field 306 in the acknowledgment frame 300 comprises only the BA starting sequence control field 308 and does not contain the BA bitmap field 309, and the number of frames acknowledged in the length subfield 305h of the BA control field 305 is equal to the number of frames with a sequence number greater than the sequence number indicated in the BA starting sequence control field 308 that are unsuccessfully received by the receiver. That is, the length subfield 305h of the BA control field 305 of the acknowledgment frame 300 in the second frame acknowledgment format indicates a number of unsuccessfully received frames that have a sequence number greater than the sequence number indicated in the BA starting sequence control field 308.

When B2=0 and B3=1, bit B4 of the BA control field 305 of the acknowledgment frame 300 indicates whether the status of the unsuccessfully received frames are reported or whether the status of the correctly received frames are reported in the acknowledgment frame 300. For example, B2=0, B3=1, and B4=0 indicates that the unsuccessfully received frames are reported. B2=0, B3=1, and B4=1 indicates that the correctly received frames are reported. Moreover, bit B5 in the length subfield 305h of the BA control field 305 indicates whether the BA information field 306 of the acknowledgment frame 300 comprises only the BA starting sequence control field 308 or both the BA starting sequence control field 308 and the BA bitmap field 309. For example, B5=0 indicates that each of the frames is correctly received by the receiver and that the BA information field 306 does not contain any acknowledgment information apart from the BA starting sequence control field 308. B5=1 indicates that the BA information field 306 comprises additional acknowledgment information apart from the BA starting sequence control field 308.

When B2=1 and B3=1, bit B4 indicates whether the BA information field 306 of the acknowledgment frame 300 comprises only the BA starting sequence control field 308 or both the BA starting sequence control field 308 and the BA bitmap field 309. For example, B2=1, B3=1, and B4=0 indicates that each of the frames is correctly received by the receiver and the BA information field 306 does not contain any other acknowledgment information apart from the BA starting sequence control field 308. B2=1, B3=1, and B4=1 indicates that the BA information field 306 comprises additional acknowledgment information apart from the BA starting sequence control field 308. In this case, bits B5-B11 in the length subfield 305h of the BA control field 305 indicate the number of frames acknowledged by the receiver. The frames acknowledged by the receiver in the BA bitmap field 309 of the BA information field 306 of the acknowledgment frame 300 excludes the frame with the sequence number indicated in the BA starting sequence control field 308.

Figure 5:
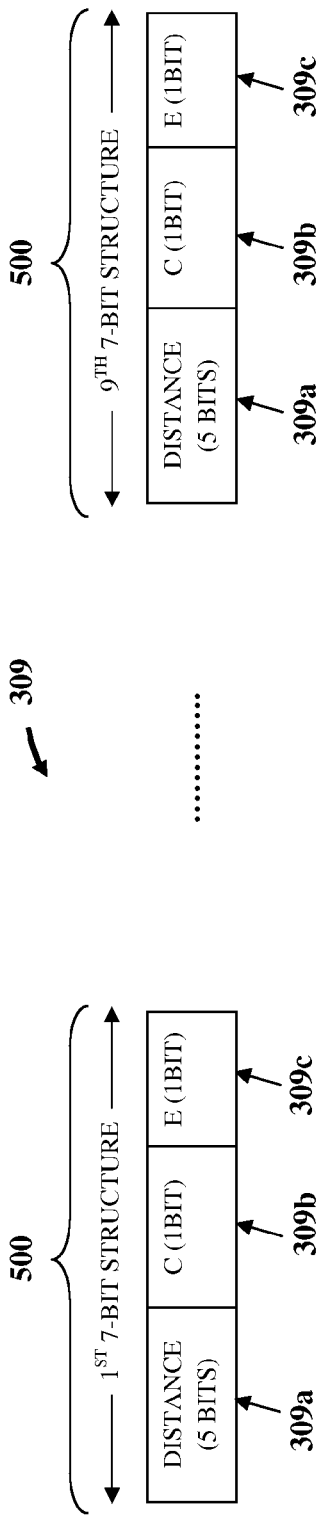
FIG. 5 exemplarily illustrates a structure of a block acknowledgment bitmap field of the acknowledgment frame in a third frame acknowledgment format.

FIG. 5 exemplarily illustrates a structure of a block acknowledgment (BA) bitmap field 309 of the acknowledgment frame 300, exemplarily illustrated in FIGS. 3A-3B, in the third frame acknowledgment format. The structure of the third frame acknowledgment format for the acknowledgment frame 300 comprises multiple repeatable 7-bit structures 500 in the BA bitmap field 309 of the BA information field 306 exemplarily illustrated in FIGS. 3A-3B. The 7-bit structures 500 are defined in the BA bitmap field 309 in the third frame acknowledgment format instead of the bitmap that is used in the standard format. In a BA bitmap field 309 which is, for example, 64 bits long there are, for example, a maximum of 9 repetitions of the 7-bit structure 500. That is, the repeatable 7-bit structures 500 replace the 64-bit bitmap in the BA bitmap field 309 of the BA information field 306 of the acknowledgment frame 300. The $64^{th}$ bit in the BA bitmap field 309 is reserved. If fewer repetitions of the 7-bit structure 500 are required for reporting the status of reception of the frames, then a few reserved bits is added at the end of the BA bitmap field 309 to obtain byte alignment. For example, if five repetitions of the 7-bit structure 500 are required for reporting the status of reception of the frames, then the five 7-bit structures 500 occupy 35 bits. In order to obtain byte alignment, 5 reserved bits are added at the end of the BA bitmap field 309 to take the length of the BA bitmap field 309 to 40 bits, that is, 5 bytes. In this example, the BA bitmap field 309 is 5 bytes long.

The 7-bit structure 500 comprises a 5-bit distance subfield 309a, a first 1-bit flag field 309b, and a second 1-bit flag field 309c. The distance subfield 309a indicates the distance, that is, the number of bits between successive ones or successive zeroes in the bitmap. As used herein, the term "distance" refers to the distance between the frame with sequence number "x" and the frame with sequence number "y" where x>y, that is, the number of frames between the sequence number "x" and the sequence number "y" and equals to x−y−1.

In an example, the distance subfield 309a indicates the distance, in number of bits, between successive correctly received frames, that is, ones in a bitmap when the receiver is reporting the status of the correctly received frames. Consider an example of a 64-bit bitmap as follows:
1000000000000000000000000000000000000000000000000000000000000001
In this example, there are 62 zeroes between the 2 successive ones in the bitmap. Hence, the distance encoded in the distance subfield 309a indicates the number of frames, in bits, that are unsuccessfully received between the 2 successive correctly received frames. Therefore, the distance is 62.

In another example, the distance subfield 309a indicates the distance, in number of bits, between successive zeroes in the bitmap, when the receiver is reporting the status of the frames that are unsuccessfully received. In this case, the distance indicated in the distance subfield 309a indicates the distance between the successive zeroes in the bitmap. Hence, the distance indicates the number of frames that are correctly received between 2 unsuccessfully received frames. Consider an example of a 64-bit bitmap as follows:
1011101111111111111111111111111111111111111111111111111111111111
In this example, there are 3 bits between the 2 successive zeroes. Therefore, the distance is 3.

The first 1-bit flag field 309b of the 7-bit structure 500 contains a flag C that indicates whether encoding of the distance continues in the next 7-bit structure 500. The second 1-bit flag field 309c of the 7-bit structure 500 contains a flag E that indicates whether the reporting of the status of the reception of the frames has terminated or not.

Consider an example of a 64-bit bitmap as follows:
1011101111111111111111111111111111111111111111111111111111111110
In this example, consider that the receiver has not received the $2^{nd}$, $6^{th}$, and the $64^{th}$ frame out of the 64 frames starting from a particular sequence number, which needs to be acknowledged. 1 indicates that a frame has been correctly received and 0 indicates that the frame has been unsuccessfully received. Since there are only 3 zeroes in the bitmap, the receiver selects the third frame acknowledgment format for the acknowledgment frame 300 to report the status of the 3 unsuccessfully received frames. The distance, in bits, between the $2^{nd}$ and the $6^{th}$ frame is 3, that is, 0011 in binary. Consider for example, that the sequence number of the $2^{nd}$ frame from where the reporting of the status of reception of the frames begins is 33. Hence, the BA starting sequence control field 308, exemplarily illustrated in FIG. 3B, in the BA information field 306 of the acknowledgment frame 300 is 33.

In the first 7-bit structure 500, the distance indicated in the distance subfield 309a is 00011, flag C is 0 indicating that encoding of the distance does not continue in the next 7-bit structure 500, and flag E is 0 indicating that the reporting of the status of the reception of the frames has not terminated. The distance between $6^{th}$ and the $64^{th}$ frame is 57, that is, 111001 in binary. Therefore, in the second 7-bit structure 500, the distance indicated in the distance subfield 309a is 11001, that is, the 5 least significant bits (LSBs) of the distance 111001; flag C is 1 indicating that the encoding of the distance continues in the next 7-bit structure 500; and flag E bit is 0 indicating that the reporting of the status of the reception of the frames has not terminated. In the third 7-bit structure 500, the distance indicated in the distance subfield 309a is 00001, that is, the most significant bits (MSBs) of the distance 111001; flag C is 0 indicating that the encoding of the distance does not continue in the next 7-bit structure 500; and flag E is 1 indicating that the reporting of the status of the reception of the frames has terminated.

In this example, only 21 bits, that is, 7 bits*3, are used to report the unsuccessfully received frames. The remaining 43 bits (64−21) can be used to report the status of reception of more frames if necessary. Otherwise, 3 padding bits are added at the end of the BA bitmap field 309 to provide byte alignment. Therefore, the acknowledgment information in the BA bitmap field 309 is 3 bytes, that is, 24 bits long. Hence, 5 bytes out of 8 bytes are saved, which amounts to 62% reduction in the size of the BA bitmap field 309. The BA control field 305, exemplarily illustrated in FIG. 4B, in the acknowledgment frame 300 comprises the following values: B2=0, B3=1 which indicates that the third frame acknowledgment format is used for the acknowledgment frame 300; B4=0 which indicates that the unsuccessfully received frames are reported; B5=1 which indicates that the BA information field 306 of the acknowledgment frame 300 comprises additional acknowledgment information apart from the BA starting sequence control field 308.

Consider an example where all the frames are correctly received. The BA information field 306 in the acknowledgment frame 300 will not have a BA bitmap field 309. The BA information field 306 in the acknowledgment frame 300 will only have the BA starting sequence control field 308 which indicates that all the frames having a sequence number less than the BA starting sequence control field 308 have been correctly received. The BA control field 305 in the acknowledgment frame 300 comprises the following values: B2=0 and B3=1 which indicates that the third frame acknowledgment format is used for the acknowledgment frame 300; B4=X, that is, a "don't care" term which represents that X may have any data value; B5=0 which indicates that the acknowledgment frame 300 contains only the BA starting sequence control field 308. For example, if all the frames till sequence number 512 have been correctly received by the receiver, the BA information field 306 in the acknowledgment frame 300 only contains the 2-byte long BA starting sequence control field 308. The BA starting sequence control field 308 comprises the sequence number 513 indicating that all the frames till sequence number 512 have been correctly received by the receiver.

Consider an example of a 64-bit bitmap as follows: 1100110000000000000000000000000000000000000000 0000000000000110
In this example, 1 indicates that a frame has been correctly received and 0 indicates that the frame has been unsuccessfully received. In this example, out of 64 frames which need to be acknowledged starting from a particular sequence number, the receiver has correctly received only the $1^{st}$, $2^{nd}$, $5^{th}$, $6^{th}$, $62^{nd}$ and $63^{rd}$ frames. This is an example of a burst error. The term "burst error" refers to a contiguous sequence of frames that are unsuccessfully received. The receiver selects a frame acknowledgment format based on the nature of the error. For example, in the case of a burst error, since there are only 6 ones in the bitmap, the receiver selects the third frame acknowledgment format for acknowledging the 6 correctly received frames. The distance, in bits, between the $1^{st}$ frame and the $2^{nd}$ frame is 0. Consider for example that the sequence number of the $1^{st}$ frame from where the reporting of the status of reception of the frames begins is 22. Hence, the BA starting sequence control field 308 in the BA information field 306 of the acknowledgment frame 300 is 22. In the first 7-bit structure 500, the distance indicated in the distance subfield 309a is 00000; flag C is 0 indicating that the encoding of the distance does not continue in the next 7-bit structure 500; and flag E is 0 indicating that the reporting of the status of the reception of the frames has not terminated.

The distance in bits between the $2^{nd}$ and the $5^{th}$ frame is 2, that is, 010 in binary. Hence, in the second 7-bit structure 500, the distance indicated in the distance subfield 309a is 00010; flag C is 0 indicating that encoding of the distance does not continue in the next 7-bit structure 500; and flag E is 0 indicating that the reporting of the status of the reception of the frames has not terminated. The distance, in bits, between the $5^{th}$ frame and the $6^{th}$ frame is again 0 and the reporting of the status of the reception of the frames does not end. Therefore, the third 7-bit structure 500 is same as the first 7-bit structure 500, that is, 0000000. The distance, in bits, between the $6^{th}$ frame and the $62^{nd}$ frame is 55, that is, 110111 in binary. Hence, in the fourth 7-bit structure 500, the distance indicated in the distance subfield 309a is 10111, that is, 5 least significant bits (LSBs) of the distance 110111; flag C is 1 indicating that the encoding of the distance continues in the next 7-bit structure 500; and flag E is 0 indicating that the reporting of the status of the reception of the frames has not terminated. In the fifth 7-bit structure 500, the distance subfield 309a is 00001, that is, the MSB of distance 110111; flag C is 0 indicating that the encoding of the distance does not continue in the next 7-bit structure 500; and flag E is 0 indicating that the reporting of the status of the reception of the frames has not terminated. The distance, in bits, between the $62^{nd}$ frame and the $63^{rd}$ frame is again 0. Hence, in the sixth 7-bit structure 500, the distance indicated in the distance subfield 309a is 00000; flag C is 0 indicating that the encoding of the distance does not continue in the next 7-bit structure 500; and flag E is 1 indicating that the reporting of the status of the reception of the frames has terminated.

In this example, only 42 bits (6*7) are used to report the unsuccessfully received frames. The remaining 22 bits (64−42) can be used to report more frames if necessary. Otherwise, 6 padding bits can be added at the end of the BA bitmap field 309 to provide byte alignment. Therefore, the entire acknowledgment information in the BA bitmap field 309 is 6 bytes, that is, 48 bits long. Hence, 2 (8−6) bytes out of 8 bytes are saved, which amounts to a 25% reduction in the size of the BA bitmap field 309. The BA control field 305 in the acknowledgment frame 300 comprises the following values: B2=0, B3=1 indicating that the third frame acknowledgment format is used for the acknowledgment frame 300; B4=1 indicating that the correctly received frames are reported; B5=1 indicating that the BA information field 306 of the acknowledgment frame 300 comprises additional acknowledgment information apart from the BA starting sequence control field 308.

Figure 6:
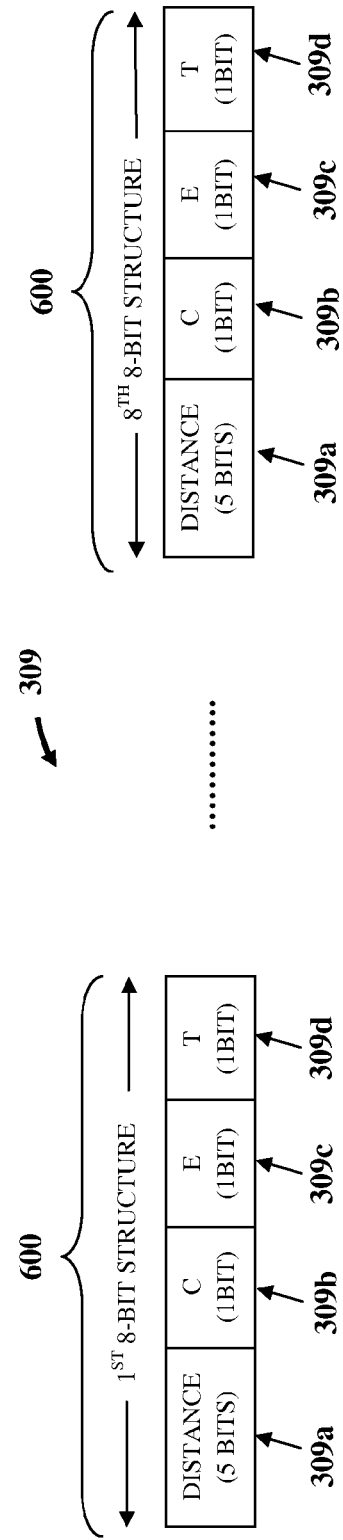
FIG. 6 exemplarily illustrates a structure of a block acknowledgment bitmap field of the acknowledgment frame in a fourth frame acknowledgment format.

FIG. 6 exemplarily illustrates a structure of a block acknowledgment (BA) bitmap field 309 of the acknowledgment frame 300, exemplarily illustrated in FIGS. 3A-3B, in the fourth frame acknowledgment format. The structure of the fourth frame acknowledgment format for the acknowledgment frame 300 comprises multiple repeatable 8-bit structures 600 that are repeated in the acknowledgment frame 300. Therefore, instead of a 64-bit bitmap as in the acknowledgment frame 300 in the standard format, there are a maximum of eight repetitions of the 8-bit structure 600. The repeatable 8-bit structures 600 replace the 64-bit bitmap in the BA bitmap field 309 of the BA information field 306 of the acknowledgment frame 300 exemplarily illustrated in FIGS. 3A-3B. The 8-bit structure 600 comprises a 5-bit distance subfield 309a, a first 1-bit flag field 309b, a second 1-bit flag field 309c, and a third 1-bit flag field 309d. The distance subfield 309a indicates the distance, that is, the number of bits between successive ones or successive zeroes in the bitmap. The first 1-bit flag field 309b of the 8-bit structure 600 contains a flag C that indicates whether encoding of the distance continues in the next 8-bit structure 600. The second 1-bit flag field 309c of the 8-bit structure 600 contains a flag E that indicates whether reporting of the status of the reception of the frames has terminated or not. The third 1-bit flag field 309d of the 8-bit structure 600 contains a flag T that indicates whether the distance, in bits, indicated in the distance subfield 309a is between a current frame and a next correctly received frame or between the current frame and the next unsuccessfully received frame. The "current frame" is at a reference point from where the receiver determines a distance between the current frame and the next unsuccessfully received frame, or between the current frame and the next correctly received frame. For example, flag T=0 indicates that the distance is between the current frame and next unsuccessfully received frame; flag T=1 indicates that the distance is between the current frame and next correctly received frame.

Figure 7A:
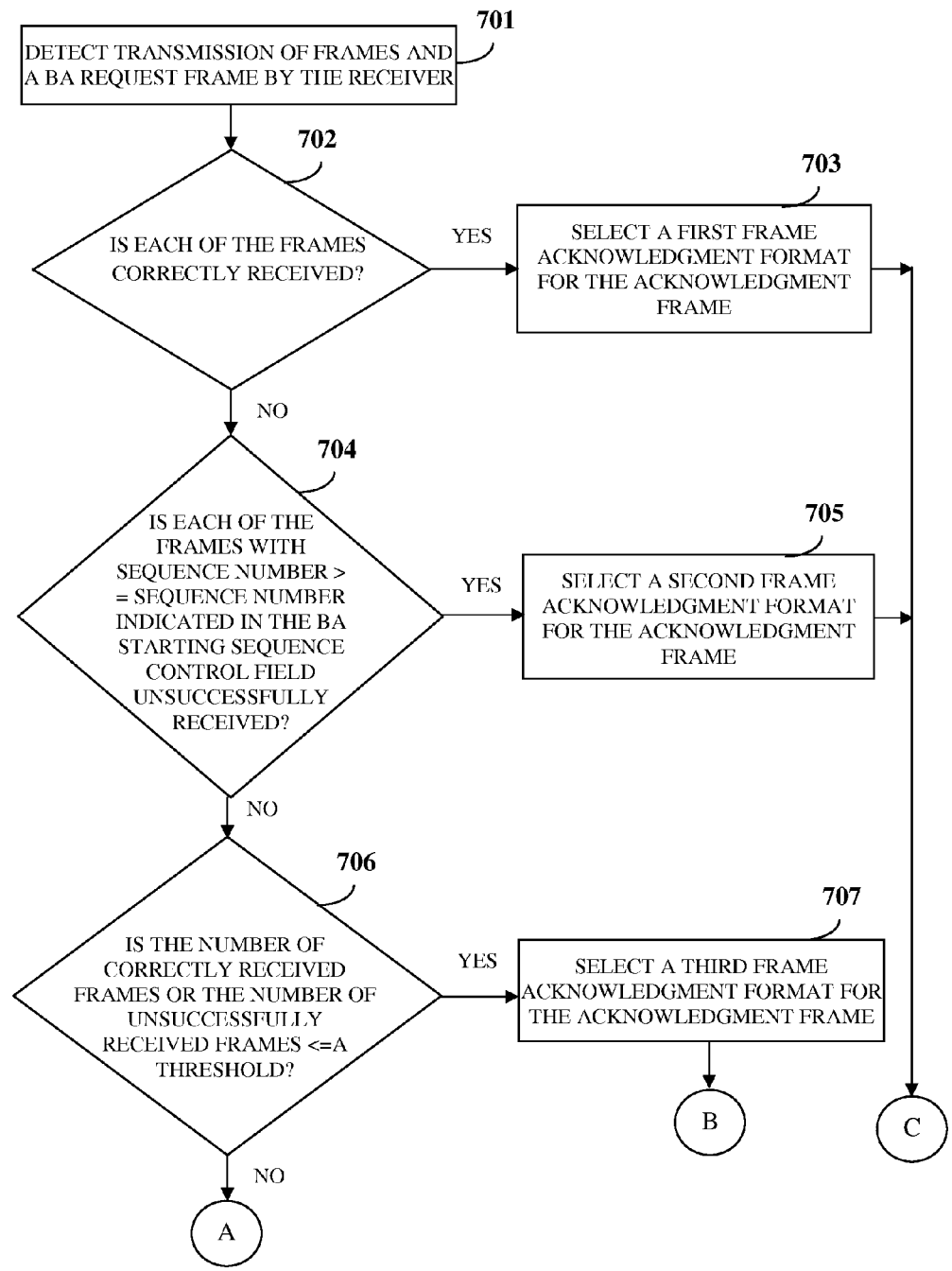
FIGS. 7A-7B exemplarily illustrate a flowchart comprising the steps for determining a format for the acknowledgment frame.
Figure 7B:
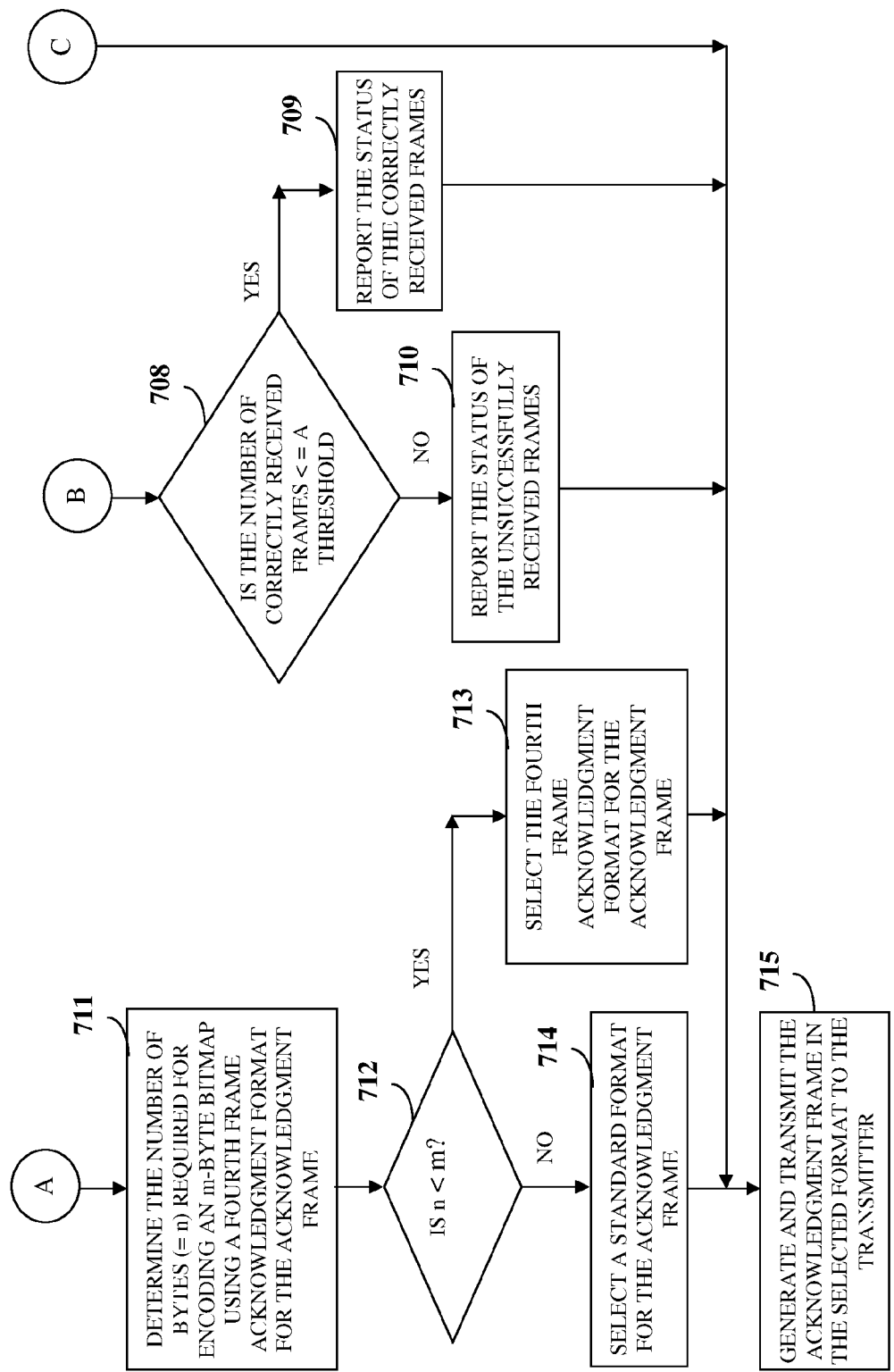

FIGS. 7A-7B exemplarily illustrate a flowchart comprising the steps for determining a format for the acknowledgment frame 300 exemplarily illustrated in FIG. 3A. The receiver determines the format for the acknowledgment frame 300, for example, using the following algorithm:

```
If all the frames are correctly received by the receiver
{
        Select the first frame acknowledgment format for the acknowledgment frame 300
        as disclosed in the detailed description of FIG. 4B.
}
Else
If ((all the frames with sequence number greater than or equal to the sequence number
indicated in the BA starting sequence control field 308, exemplarily illustrated in FIG.
3B, are unsuccessfully received)
{
        Select the second frame acknowledgment format for the acknowledgment frame
        300 as disclosed in the detailed description of FIG. 4B.
}
Else
If ((the number of correctly received frames < = threshold)
OR
    (the number of unsuccessfully received frames < = threshold))
    {
    Select the third frame acknowledgment format, exemplarily illustrated in FIG. 5, for
    the acknowledgment frame 300
    If (the number of correctly received frames < = threshold)
            Report the correctly received frames
    Else
            Report the unsuccessfully received frames
    }
    Else
    {
        Calculate the number of bytes "n" required to encode an m-byte bitmap using the
        fourth frame acknowledgment format, exemplarily illustrated in FIG. 6, for the
        acknowledgment frame 300
        If (n < m)
        {
            Select the fourth frame acknowledgment format, exemplarily illustrated in
            FIG. 6, for the acknowledgment frame 300
        }
        Else
        {
            Select the standard format for the acknowledgment frame 300
        }
    }
EndIf
```

As exemplarily illustrated in FIGS. 7A-7B, the receiver detects 701 transmission of frames and a block acknowledgment (BA) request frame that requests the acknowledgment status of the frames, from the transmitter. The receiver checks 702 whether each of the frames is correctly received. If each of the frames is correctly received, the receiver selects 703 the first frame acknowledgment format for the acknowledgment frame 300. If each of the frames is not correctly received, the receiver checks 704 whether each of the frames with sequence number greater than or equal to the sequence number indicated in the BA starting sequence control field 308 exemplarily illustrated in FIG. 3B, is unsuccessfully received. If each of the received frames with sequence number greater than or equal to the sequence number indicated in the BA starting sequence control field 308 is unsuccessfully received, the receiver selects 705 the second frame acknowledgment format for the acknowledgment frame 300.

If each of the frames with sequence number greater than or equal to the sequence number indicated in the BA starting sequence control field 308 is not unsuccessfully received, the receiver determines a number of correctly received frames and a number of unsuccessfully received frames. Moreover, the receiver determines a threshold based on the number of frames for which the receiver needs to report the status of reception.

The receiver determines the threshold as follows: In a BA bitmap field 309, exemplarily illustrated in FIG. 3B, that is, for example, 64 bits long, there can be a maximum of 9 repetitions of a 7-bit structure 500 exemplarily illustrated in FIG. 5, that is, 7*9=63 bits, with 1 padding bit to provide byte alignment. If the number of repetitions of the 7-bit structure 500 is 8, that is, 64−8*7=8 bits, that is, 1 byte can be saved. If the number of repetitions of the 7-bit structure 500 is less than 8, more bytes can be saved. Therefore, the receiver selects the third frame acknowledgment format for the acknowledgment frame 300 when the required number of repetitions of the 7-bit structure 500 is 8 or less for a 64-bit bitmap. Eight 7-bit structures 500 can report eight correctly received frames or eight unsuccessfully received frames, provided each reporting uses one 7-bit structure 500. The number of correctly received frames or the number of unsuccessfully received frames reported in the BA bitmap field 309 is equal to the number of distances encoded. For example, if the number of distances encoded is 3, between zeros in the bitmap, then the receiver reports 3 unsuccessfully received frames. That is, the first encoded distance is between the frame indicated by the BA starting sequence control field 308 and the first 0 in the bitmap, the second encoded distance is between the first 0 and the second 0 in the bitmap, and the third encoded distance is between the second 0 and the third 0 in the bitmap, where 0 represents an unsuccessfully received frame.

The distance subfield 309a in the 7-bit structure 500 is 5 bits long as exemplarily illustrated in FIG. 5. The maximum value that can be encoded by the distance subfield 309a is 31. Therefore, eight 7-bit structures 500 can report eight frames if all the eight distances are less than 32. Furthermore, maximum distance is 63 for a 64-bit bitmap. If the distance subfield 309a has a value "d" such that 31<d<64, then two 7-bit structures 500 are required to encode the distance "d". Therefore, in a 64-bit bitmap, encoding of a distance requires two 7-bit structures 500 at most. That is, in a 64-bit bitmap, there can be a maximum of two distance subfields 309a which have a value "d" such that 31<d<64. In this case, the number of frames reported is 2, but the number of 7-bit structures 500 required is 4.

If there is only one distance subfield 309a with the value "d" such that 31<d<64, the maximum number of frames that can be reported by the acknowledgment frame 300 in the third frame acknowledgment format is 7. That is, the receiver reports 6 frames using single 7-bit structures 500 and 1 frame using two 7-bit structures 500. The total number of 7-bit structures 500 that are repeated in the BA bitmap field 309 is 8, which ensures that at least 1 byte is saved. In a worst-case scenario, 7 frames can be reported, that is, there can be seven ones or seven zeroes in the bitmap and still save 1 byte. Therefore, the threshold value is 7 for a 64-bit bitmap.

Generalizing the deduction for an m-byte bitmap, that is, m*8 bits bitmap, the number of 7-bit structures 500 the m-byte bitmap can have=(m*8)/7. The number of padding bits required to provide byte alignment=(m*8) mod 7. The number of 7-bit structures 500 required to save at least 1 byte=(((m*8)/7)−1). Therefore, when the number of repetitions of the 7-bit structure 500 is (((m*8)/7)−1) or less, receiver should select the third frame acknowledgment format, which ensures that at least 1 byte is saved.

In an m-byte bitmap, the maximum distance between two zeroes or two ones=(m*8)−1. The number of bits required to encode (m*8)−1=trunc ((Log((m*8)−1))+1), where the trunc function truncates a decimal portion of a floating point number. For example, trunc (6.2)=6. In the 7-bit structure 500, the distance subfield 309a is 5 bits long. Hence, the number of 7-bit structures 500 required to encode the distance ((m*8)−1)=n=ceil ((trunc ((Log((m*8)−1))+1))/5), where ceil function ceil (n)=x, where x is an integer value and n<=x<n+1. For example, ceil (5.0)=5, ceil (5.2)=6. The division used for the calculation of n is, for example, floating point division. The log used is of base 2.

Therefore, in a worst-case scenario, there is one 5-bit distance subfield 309a with value "d" such that 31<d<(m*8), that uses more than one 7-bit structure 500; the remaining distances uses only one 7-bit structure 500. Hence, the number of frames that can be reported and at least 1 byte saved is, ((m*8)/7−1)−n)+1=(m*8)/7−n, where n=ceil ((trunc((Log ((m*8)−1))+1))/5) Therefore, the threshold=(m*8)/7−n, where n=ceil ((trunc((Log((m*8)−1))+1))/5), where the trunc function truncates the decimal portion of a floating point number. For example, trunc (6.2)=6, and the ceil function ceil(n)=x, where x is an integer value and n<=x<n+1. For example, ceil(5.0)=5, ceil(5.2)=6, ceil(5.7)=6.

As exemplarily illustrated in FIGS. 7A-7B, after determining the threshold, the receiver then checks 706 whether the determined number of correctly received frames or the determined number of unsuccessfully received frames is less than or equal to the threshold. If the determined number of correctly received frames or the determined number of unsuccessfully received frames is less than or equal to the threshold, the receiver selects 707 the third frame acknowledgment format for the acknowledgment frame 300. The receiver then checks 708 if the determined number of correctly received frames is less than or equal to the threshold. If the determined number of correctly received frames is less than or equal to the threshold, the receiver reports 709 the status of the correctly received frames. Consider an example of the following 64-bit bitmap: 1100110000000000000000000000000000000000000000000000000001111

This is an example of a burst error where most of the frames are unsuccessfully received, that is, 56 frames out of 64 frames are unsuccessfully received. In this case, the receiver only reports the 8 frames which are correctly received, that is, the 8 ones in the bitmap, instead of acknowledging all the 64 frames.

If the determined number of correctly received frames is not less than or equal to the threshold and if the determined number of unsuccessfully received frames is less than or equal to the threshold, the receiver reports 710 the status of the unsuccessfully received frames. Consider an example of the following 64-bit bitmap: 1111101111111111111111100111111111110111111011111111111111111111

Out of 64 frames to be acknowledged only 5 frames are unsuccessfully received, while the remaining 59 frames are correctly received. In this case, the receiver only reports the 5 frames which are unsuccessfully received, that is, the 5 zeros in the bitmap.

If the determined number of correctly received frames or the determined number of unsuccessfully received frames is greater than the threshold, the receiver determines 711 the number of bytes (n) required for encoding an m-byte bitmap when using the fourth frame acknowledgment format for the acknowledgment frame 300. The receiver then checks 712 if n<m. If n<m, the receiver selects 713 the fourth frame acknowledgment format for the acknowledgment frame 300. If n>m, the receiver selects 714 the standard format for the acknowledgment frame 300. The receiver generates the acknowledgment frame 300 in the selected format and transmits 715 the generated acknowledgment frame 300 in the selected format to the transmitter.

Enumerated herein are examples of the method disclosed herein for acknowledging the frames.

In an example, all the frames with sequence number less than "n" are correctly received. The receiver selects the first frame acknowledgment format for the acknowledgment frame 300. The BA starting sequence control field 308 in the acknowledgment frame 300 has the value "n" which indicates that all the frames having sequence number less than "n" have been received correctly. Consider an example where all the frames are correctly received and the sequence number of the last correctly received frame is 45, which is also the last frame for which the receiver needs to report the status of reception. The BA starting sequence control field 308 in the acknowledgment frame 300 has a value 46 which indicates that all the frames till sequence number 45 have been correctly received. The BA control field 305, exemplarily illustrated in FIG. 4B, in the acknowledgment frame 300 has the following values: B2=1, B3=1 and B4=0 which indicates that all the frames are correctly received and that the acknowledgment frame 300 does not contain any acknowledgment information apart from the BA starting sequence control field 308. The status of correct reception of the frames is reported in the length subfield 305h, exemplarily illustrated in FIG. 4B, as 0.

In another example, all the frames with the sequence number>=n are unsuccessfully received and the number of frames for which the receiver needs to report the status of reception is "m", where m>n. In this example, the receiver selects the second frame acknowledgment format for the acknowledgment frame 300. The BA starting sequence control field 308 in the acknowledgment frame 300 has the value "n" which indicates that all the frames having sequence number less than "n" have been correctly received. The BA control field 305 in the acknowledgment frame 300 will have the following values: B2=1, B3=1 and B4=0, which indicates that the BA information field 306 of the acknowledgment frame 300, exemplarily illustrated in FIGS. 3A-3B, does not contain any acknowledgment information apart from BA starting sequence control field 308. The number of frames reported in the length subfield 305h of the BA control field 305 is m−n.

Consider an example where frames with sequence numbers 30 to 45 are unsuccessfully received. The sequence number of the last frame for which the receiver needs to report the status of reception is 45. The BA starting sequence control field 308 in the acknowledgment frame 300 indicates the sequence number of the first unsuccessfully received frame, that is, 30. The BA control field 305 in the acknowledgment frame 300 has the following values: B2=1, B3=1 and B4=0 which indicates that the acknowledgment frame 300 does not contain any acknowledgment information apart from the BA starting sequence control field 308. The number of frames reported in the length subfield 305h of the BA control field 305 is 15. In this example, the use of the standard format for the acknowledgment frame 300 would have required an 8-byte bitmap. However, use of the second frame acknowledgment format for the acknowledgment frame 300 results in not using the BA bitmap field 309 of the BA information field 306 amounting to byte savings of 100%.

In another example, only 1 frame with sequence number "n" out of 64 frames to be reported is unsuccessfully received. The sequence number of the last correctly received frame is "m" and m>n. In this case, the size of the bitmap is 8 bytes and the threshold is 7. Therefore, the receiver selects the third frame acknowledgment format for the acknowledgment frame 300 as the number of unsuccessfully received frames, that is, 1 is less than the threshold. The BA starting sequence control field 308 in the acknowledgment frame 300 will have value "n" which indicates that all the frames having sequence number less than "n" have been correctly received. In this case, the distance "d" between the only unsuccessfully received frame with sequence number=n and the next frame not yet received with sequence number=m+1 is calculated. Hence the distance "d"=(m+1)−n−1=m−n. Hence, the receiver encodes the distance "m−n" in the BA bitmap field 309 of the BA information field 306 of the acknowledgment frame 300.

In another example, only 3 frames are unsuccessfully received out of 64 frames to be acknowledged in an 8-byte bitmap. Hence, the threshold is 7. The number of unsuccessfully received frames, that is, zeroes in the bitmap is 3 which is less than the threshold value of 7. Hence, the receiver selects the third frame acknowledgment format for the acknowledgment frame 300. Moreover, since the number of unsuccessfully received frames, that is, zeroes in the bitmap is less than the threshold, only the unsuccessfully received frames are reported.

In another example, only 2 frames are correctly received out of 64 frames to be acknowledged in an 8-byte bitmap. Hence, the threshold is 7. The number of correctly received frames, that is, ones in the bitmap is 2 which is less than the threshold value of 7. Hence, the receiver selects the third frame acknowledgment format for the acknowledgment frame 300. Moreover, since the number of correctly received frames, that is, ones in the bitmap is less than threshold value 7, only the correctly received frames are reported.

Figure 8A:
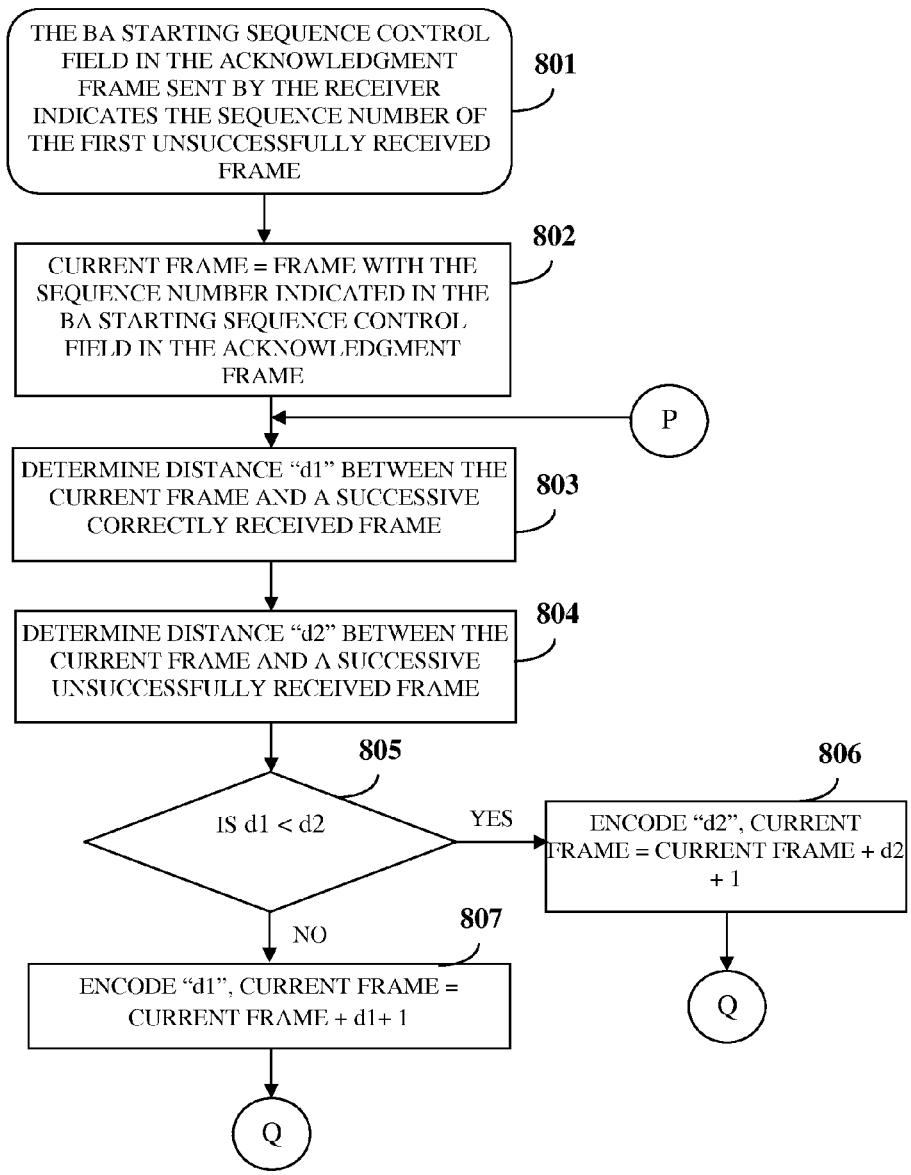
FIGS. 8A-8C exemplarily illustrate a flowchart comprising the steps for acknowledging multiple frames with a decreased number of bytes using the acknowledgment frame in the fourth frame acknowledgment format.
Figure 8B:
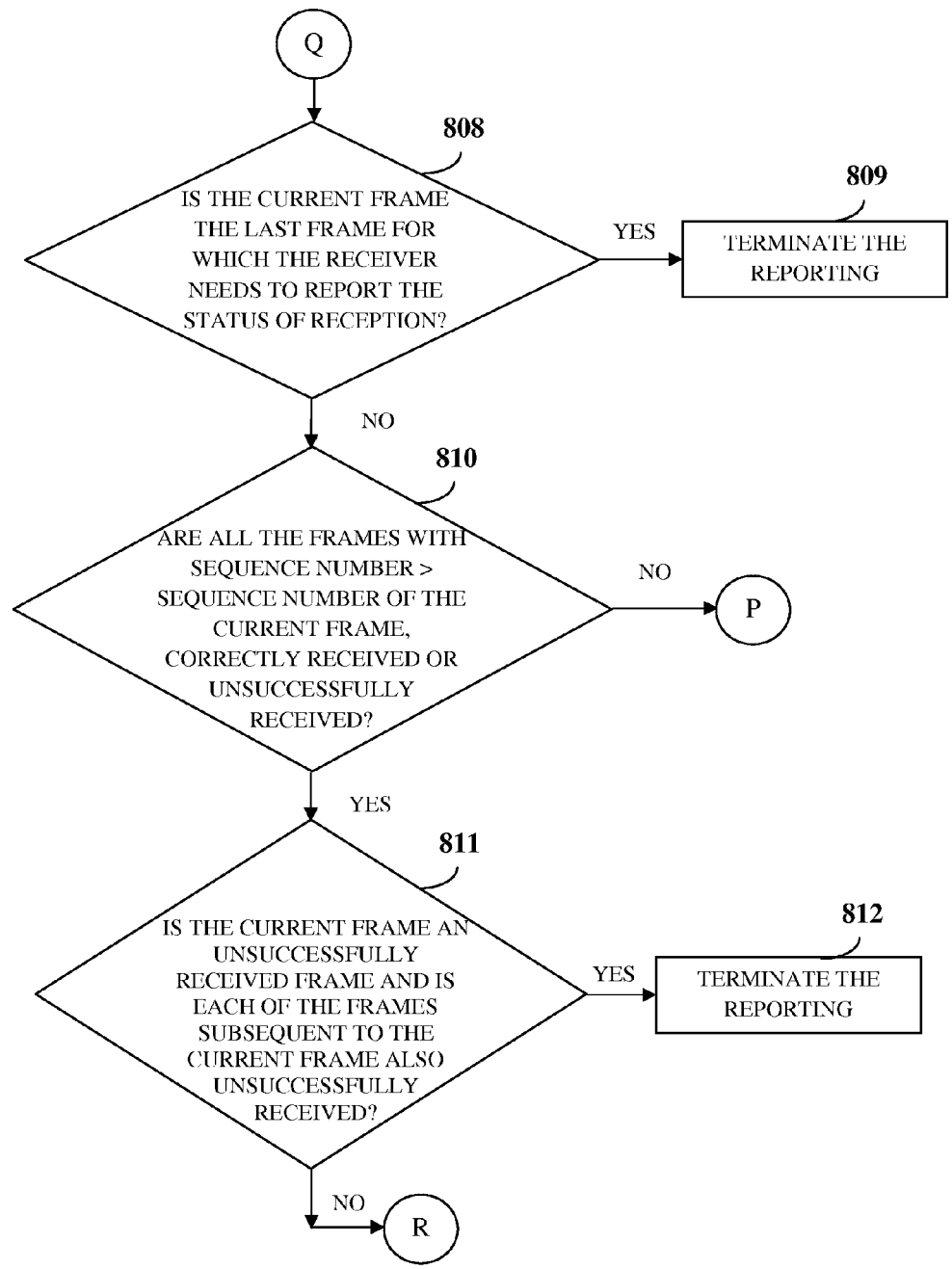
Figure 8C:
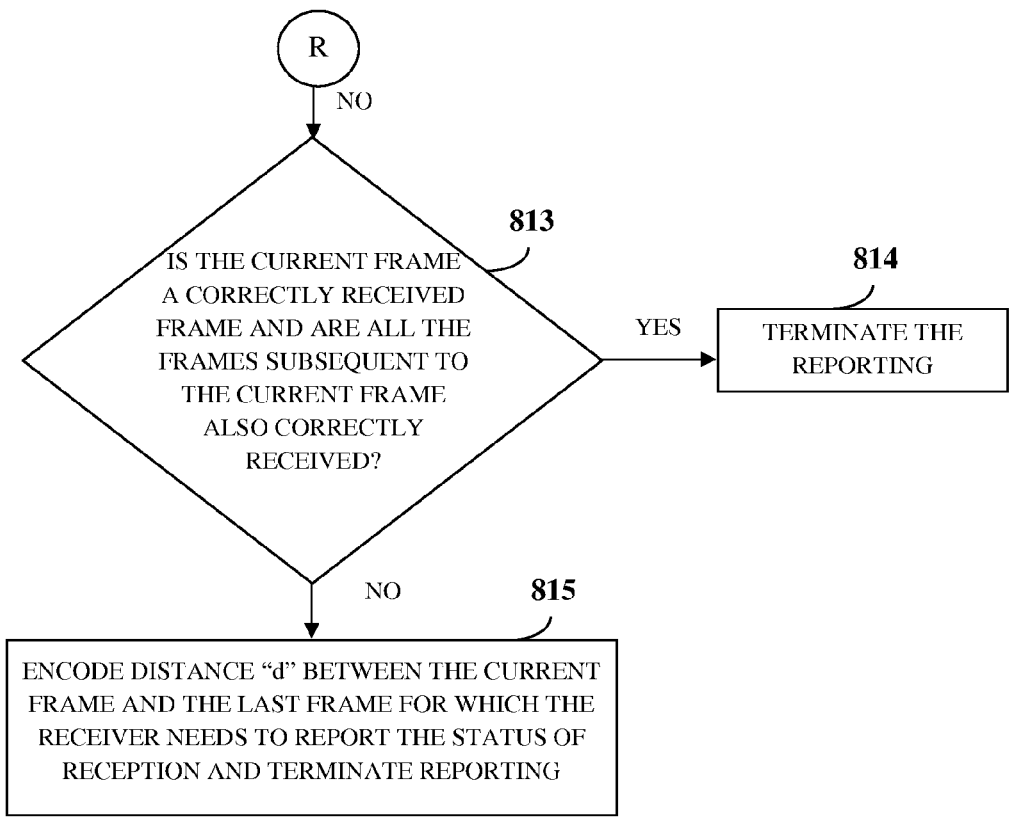

FIGS. 8A-8C exemplarily illustrate a flowchart comprising the steps for acknowledging multiple frames with a decreased number of bytes using the acknowledgment frame 300, exemplarily illustrated in FIG. 3A, in the fourth frame acknowledgment format. In an example, the BA starting sequence control field 308, exemplarily illustrated in FIG. 3B, in the acknowledgment frame 300 sent by the receiver indicates 801 the sequence number of the first unsuccessfully received frame. In a first instance, a current frame is the frame with the sequence number indicated 802 in the BA starting sequence control field 308 in the acknowledgment frame 300. The current frame is at a reference point from where the receiver determines a first distance "d1" and a second distance "d2". The receiver determines 803 the first distance "d1", in bits, between the current frame and a successive correctly received frame. The receiver next determines 804 the second distance "d2", in bits, between the current frame and a successive unsuccessfully received frame. The receiver checks 805 whether "d1" is less than "d2". If "d1" is less than "d2", the receiver encodes 806 the second distance "d2" in the acknowledgment frame 300 in the fourth frame acknowledgment format and updates the current frame as current frame=current frame+d2+1. That is, the receiver successively changes the reference point to a point one more than the determined greater distance away from the reference point for determining the first distance and the second distance from the successively changed reference point. At each instance, the frame at the successively changed reference point is represented as the current frame. If "d1" is greater than "d2", the receiver encodes 807 the first distance "d1" in the acknowledgment frame 300 in the fourth frame acknowledgment format and updates the current frame as current frame=current frame+d1+1. The encoded distance "d1" or "d2" is added to the BA bitmap field 309 of the BA information field 306 of the acknowledgment frame 300, exemplarily illustrated in FIGS. 3A-3B, in the fourth frame acknowledgment format.

The receiver checks 808 whether the current frame is the last frame for which the receiver needs to report the status of reception. If the current frame is the last frame for which the receiver needs to report the status of reception, then the receiver terminates 809 the reporting of the status of reception of the frames. If the current frame is not the last frame for which the receiver needs to report the status of reception, then the receiver checks 810 whether all the frames with sequence number greater than the sequence number of the current frame, are correctly received or unsuccessfully received. If all the frames with sequence number greater than the sequence number of the current frame are not correctly received or if all the frames with sequence number greater than the sequence number of the current frame are not unsuccessfully received, the receiver repeats steps 803 to 810 until the status of reception of all the frames to be acknowledged are added to the BA bitmap field 309 of the acknowledgment frame 300. That is, the receiver again determines the first distance "d1" from the current frame, which is now at distance "d1+1" or "d2+1" from the first unsuccessfully received frame. The receiver also determines the second distance "d2" between the current frame and a successive unsuccessfully received frame. Again, if d1<d2, the receiver encodes d2 in the acknowledgment frame 300 in the fourth frame acknowledgment format, else the receiver encodes d1 in the acknowledgment frame 300 in the fourth frame acknowledgment format. The encoded d1 or d2 is added to the BA bitmap field 309 of the acknowledgment frame 300. Either d1 or d2 is zero and hence the receiver encodes the non-zero value.

If all the frames with sequence number greater than the sequence number of the current frame are either correctly received or unsuccessfully received, the receiver checks 811 whether the current frame is an unsuccessfully received frame and whether each of the frames subsequent to the current frame is also unsuccessfully received. If the current frame is an unsuccessfully received frame and if each of the frames subsequent to the current frame is also unsuccessfully received frames, then the receiver terminates 812 the reporting of the status of reception of the frames. That is, if the encoded distance in the BA bitmap field 309 is the second distance "d2" between the current frame and the subsequent unsuccessfully received frame and all the frames beyond a distance "d" from the current frame are also unsuccessfully received, then the subsequent frames beyond distance "d" from the current frame are not reported in BA bitmap field 309. This is because, on receiving the acknowledgment frame 300 from the receiver, the transmitter deduces that the subsequent frames beyond distance "d" from the current frame, which is equal to the sum of all encoded distances subtracted from the number of frames indicated in the length subfield 305h of the BA control field 305 exemplarily illustrated in FIG. 4B, are also unsuccessfully received frames, as the last encoded distance terminated at an unsuccessfully received frame.

If the current frame is not an unsuccessfully received frame and if all the frames subsequent to the current frame are not unsuccessfully received frames, then the receiver checks 813 whether the current frame is a correctly received frame and whether all the frames subsequent to the current frame are also correctly received. If the current frame is a correctly received frame and if all the frames subsequent to the current frame are also correctly received, then the receiver terminates 814 the reporting of the status of reception of the frames and no more acknowledgment information is added to the BA bitmap field 309. That is, if the encoded distance in the BA bitmap field 309 is the first distance "d1" between the current frame and the subsequent correctly received frame and all the subsequent frames beyond distance "d" from the current frame are also correctly received frames then the subsequent frames are not reported in the BA bitmap field 309. This is because, on receiving the acknowledgment frame 300 from the receiver, the transmitter deduces that the subsequent frames beyond distance "d" from the current frame, which is equal to the sum of all encoded distances subtracted from the number of frames indicated in the length subfield 305h of the BA control field 305, are also correctly received frames, since the last encoded distance terminated at a correctly received frame.

If the current frame is an unsuccessfully received frame and if all frames subsequent to the current frame are correctly received frames or if the current frame is a correctly received frame and if all frames subsequent to the current frame are unsuccessfully received frames, the receiver encodes 815 the distance "d" between the current frame and the last frame for which the receiver needs to report the status of reception and terminates the reporting. Therefore, the receiver constructs an acknowledgment frame 300 by using combinations of the distance between two unsuccessfully received frames, the distance between two correctly received frames, and the distance between an unsuccessfully received frame and a correctly received frame.

Enumerated herein are examples of the method disclosed herein for acknowledging multiple frames using the acknowledgment frame 300 in the fourth frame acknowledgment format exemplarily illustrated in FIG. 6.

Consider an example where only 1 frame is unsuccessfully received, the sequence number of which is 23. The sequence number of the last correctly received frame is 45, which is also the last frame for which acknowledgment status needs to be sent by the receiver. The BA starting sequence control field 308, exemplarily illustrated in FIG. 3B, in the acknowledgment frame 300 indicates the sequence number of the first unsuccessfully received frame as 23. The distance "d" between the frame with the sequence number 23 and the last correctly received frame with the sequence number 45 is 21.

Therefore, the receiver needs to encode the distance 21. Therefore, in the 8-bit structure 600 exemplarily illustrated in FIG. 6, the distance indicated in the distance subfield 309a is 21, that is, 10101; flag C is 0 indicating that the encoding of the distance does not continue in the next 8-bit structure 600; flag E is 1 indicating that the reporting of the status of the reception of the frames has terminated; and flag T is 1 indicating that the encoded distance is between the first unsuccessfully received frame and the subsequent correctly received frame. The BA control field 305, exemplarily illustrated in FIG. 4B, in the acknowledgment frame 300 will have the following values: B2=1, B3=1 and B4=1 indicating that the fourth frame acknowledgment format for the acknowledgment frame 300 is used.

In another example, consider the following bitmap:
0000001111111111111111111111111111111111111111111000
1111111111111111

In this example, the sequence number of the first unsuccessfully received frame is 62. Therefore, the BA starting sequence control field 308 in the acknowledgment frame 300 indicates 62. Here, 1 indicates that a frame has been correctly received and 0 indicates that a frame has been unsuccessfully received. In this example, the $7^{th}$ frame with sequence number=62+7=69 is the first correctly received frame in the 64-bit bitmap. Therefore, in the first 8-bit structure 600, the distance is 5, that is, 00101 in binary; the C flag is 0 indicating that the encoding of the distance does not continue in the next 8-bit structure 600; the E flag is 0 indicating that the reporting of the status of the reception of the frames has not terminated; and the T flag is 1 indicating that the distance is between the first unsuccessfully received frame and the subsequent correctly received frame.

The distance between the correctly received $7^{th}$ frame with sequence number 69 and the subsequent unsuccessfully received frame, that is, the $46^{th}$ frame with sequence number=62+46=108 is 38, that is, 100110 in binary. Therefore, in the second 8-bit structure 600, the distance subfield 309a is 00110, that is, the five least significant bits (LSBs) of the distance 100110; flag C is 1 indicating that the encoding of the distance field continues in the next 8-bit structure 600; flag E is 0 indicating that the reporting of the status of the reception of the frames has not terminated; and flag T is 0 indicating that the distance is between the current frame and the subsequent unsuccessfully received frame. In the third 8-bit structure 600, the distance subfield 309a is 00001, that is, the most significant bit (MSB) of the distance 100110; flag C is 0 indicating that the encoding of the distance does not continue in the next 8-bit structure 600; flag E is 0 indicating that the reporting of the status of the reception of the frames has not terminated; and flag T is 0.

The distance between the $46^{th}$ frame with sequence number=62+46=108 and the subsequent correctly received frame, that is, the $49^{th}$ frame with sequence number=111 is 2, that is, 00010 in binary. Therefore, in the fourth 8-bit structure 600, the distance is 2, that is, 00010 in binary; flag C is 0 indicating that the encoding of the distance does not continue in the next 8-bit structure 600; the E flag is 1 indicating that the reporting of the status of the reception of the frames has terminated; and flag T is 1 indicating that the distance is between the current frame and the subsequent correctly received frame. Since flag T is 1 and flag E is 1, and from the number of frames acknowledged by the receiver as indicated in the length subfield 305h, the remaining bits of the bitmap, that is, the last 14 bits are deduced to be 1. In this example, 4 bytes out of 8 bytes are saved, amounting to a 50% reduction in length of the BA bitmap field 309. The BA control field 305 in the acknowledgment frame 300 has the following values: B2=1, B3=1 and B4=1 indicating that the fourth frame acknowledgment format for the acknowledgment frame 300 is used.

In another example, consider the following bitmap:
1100000011111111111111111111111111111111111111
1111111111110000
In an example, the sequence number of the first unsuccessfully received frame (not shown in the above bitmap) is 55. Therefore, the BA starting sequence control field 308 in the acknowledgment frame 300 indicates 55. Here, 1 indicates that the frame has been correctly received and 0 indicates that the frame has been unsuccessfully received. The first distance "d1" between the first unsuccessfully received frame with sequence number 55 and the subsequent correctly received frame with sequence number 56 is 0. The second distance "d2" between the first unsuccessfully received frame with sequence number 55 and the subsequent unsuccessfully received frame with sequence number 58 is 2. The receiver encodes the second distance "d2", that is, 2 or 00010 in binary in the BA bitmap field 309 of the BA information field 306 of the acknowledgment frame 300. Therefore, in the first 8-bit structure 600, the distance indicated in the distance subfield 309a is 2, that is, 00010 in binary; flag C is 0 indicating that encoding of the distance does not continue in the next 8-bit structure 600; flag E is 0 indicating that the reporting of the status of the reception of the frames has not terminated; and flag T is 0 indicating that the distance is between an unsuccessfully received frame and a subsequent unsuccessfully received frame.

Distance "d1" between the $3^{rd}$ frame in the bitmap, with sequence number=55+3=58 and the subsequent correctly received frame is 5. Distance "d2" between the $3^{rd}$ frame in the bitmap with sequence number=55+3=58 and the subsequent unsuccessfully received frame is 0. Hence, the receiver encodes the distance 5, that is, 00101 in binary. Therefore, in the second 8-bit structure 600, the distance indicated in the distance subfield 309a is 5, that is, 00101 in binary; flag C is 0 indicating that encoding of the distance does not continue in the next 8-bit structure 600; flag E is 0 indicating the reporting of the status of the reception of the frames has not terminated; and flag T is 1 indicating that the distance is between the current frame and the subsequent correctly received frame.

The receiver next encodes the distance between the $9^{th}$ frame with sequence number 64 in the bitmap and the 61st frame with sequence number=55+61=116 in the bitmap. The distance is 51, that is, 110011 in binary which requires two 8-bit structures 600. In the third 8-bit structure 600, the distance indicated in the distance subfield 309a is 100 μl, that is, the five least significant bits (LSBs) of the distance; flag C is 1 indicating that the encoding of the distance continues in the next 8-bit structure 600; flag E is 0 indicating that the reporting of the status of the reception of the frames has not terminated; and flag T is 0 indicating that the distance is between the current frame and the subsequent unsuccessfully received frame. In the fourth 8-bit structure 600, the 5 bit distance subfield 309a is 00001, that is, the most significant bit (MSB) of the distance 110011; flag C is 0 indicating that the encoding of the distance does not continue in the next 8-bit structure 600; flag E is 1 indicating that the reporting of the status of the reception of the frames has terminated; and flag T is 0 indicating that the encoded distance is between the current frame and the subsequent unsuccessfully received frame. Since flag T is 0, flag E is 1, and from the number of frames acknowledged by the receiver as indicated in the length subfield 305h, the remaining bits, that is, the last 3 bits of the bitmap are deduced to be zero. In this example, 4 bytes out of 8 bytes are saved, which amounts to 50% reduction in length of acknowledgment frame 300. The BA control field 305 in the acknowledgment frame 300 will have the following values: B2=1, B3=1 and B4=1 indicating that the fourth frame acknowledgment format for the acknowledgment frame 300 is used.

In another example, out of 64 frames to be acknowledged in an 8-byte bitmap, 21 frames are unsuccessfully received. The threshold is 7. The number of unsuccessfully received frames, that is, zeroes in the bitmap is 21, which is greater than the threshold value of 7. The number of correctly received frames, that is, ones in the bitmap is 43, which is also greater than the threshold value 7. Hence, the receiver selects the standard format exemplarily illustrated in FIG. 3A that is, the compressed bitmap, or the fourth frame acknowledgment format for the acknowledgment frame 300 depending on the efficiency of the selected format. Consider an example where the frames with sequence numbers from 20 to 83 need to be reported for the acknowledgment. Consider for example that the sequence numbers of the 21 unsuccessfully received frames are as follows: 22, 23, 24, 25, 26, 27, 28, 29, 43, 55, 56, 57, 58, 59, 60, 66, 75, 76, 77, 78, 79

The receiver calculates the number of bytes required for the acknowledgment of the frames using the acknowledgment frame 300 in the fourth frame acknowledgment format. The sequence number of the first unsuccessfully received frame, indicated in the BA starting sequence control field 308 is 22. Since the next 7 frames are also unsuccessfully received, the receiver determines the distance between first unsuccessfully received frame with sequence number 22 and the subsequent correctly received frame with sequence number 30, which is 7. Therefore, the receiver encodes the distance 7 in the BA bitmap field 309 of the BA information field 306 of the acknowledgment frame 300, which requires one 8-bit structure 600.

The next unsuccessfully received frame has the sequence number 43. Therefore, the receiver determines the distance between the frame with sequence number 30 and the frame with sequence number 43. The determined distance is 12. Hence, the receiver next encodes the distance 12 in the BA bitmap field 309 of the BA information field 306 of the acknowledgment frame 300, which again needs one 8-bit structure 600. Since, the next unsuccessfully received frame has the sequence number 55, the receiver determines the distance between the frame with sequence number 43 and the frame with sequence number 55. The determined distance is 11. The receiver encodes the distance 11 in the BA bitmap field 309 of the BA information field 306 of the acknowledgment frame 300, which again needs one 8-bit structure 600.

Since the next correctly received frame has the sequence number 61, the receiver determines the distance between the frame with sequence number 55 and the frame with sequence number 61. The determined distance is 5. Hence, the receiver encodes the distance 5 in the BA bitmap field 309 of the BA information field 306 of the acknowledgment frame 300, which again requires one 8-bit structure 600. Since the next unsuccessfully received frame has the sequence number 66, the receiver determines the distance between the frame with sequence number 61 and the frame with sequence number 66. The determined distance is 4. Hence, the receiver encodes the distance 4 in the BA bitmap field 309 of the BA information field 306 of the acknowledgment frame 300, which again needs one 8-bit structure 600. Since the next unsuccessfully received frame has the sequence number 75, the receiver determines the distance between the frame with sequence number 66 and the frame with sequence number 75. The determined distance is 8. Hence, the receiver encodes the distance 8 in the BA bitmap field 309 of the BA information field 306 of the acknowledgment frame 300, which again needs one 8-bit structure 600. Since, the next correctly received frame has the sequence number 80, the receiver determines the distance between the frame with the sequence number 75 and the frame with the sequence number 80. The determined distance is 4. Hence, the receiver next encodes the distance 4 which again needs one 8-bit structure 600.

Since the frame with the sequence number 80 is correctly received and the subsequent frames with sequence numbers 81, 82, and 83 are also correctly received, no additional acknowledgment information is needed. In this example, 7 bytes are required for acknowledging the received frames when the receiver selects the fourth frame acknowledgment format and 8 bytes are required for acknowledging the received frames when the receiver selects the standard format for the acknowledgment frame 300. Therefore, the receiver selects fourth frame acknowledgment format for the acknowledgment frame 300, thereby saving 1 byte.

FIG. 9A exemplarily illustrates a table showing the number of bytes saved for different sizes of bitmaps and different bitmap values when the third frame acknowledgment format is selected for the acknowledgment frame 300 exemplarily illustrated in FIG. 3A. The first column indicates the size of the bitmap in bytes. The second column indicates the threshold which is determined by the receiver based on the size of the bitmap. The third column indicates arbitrary bitmap values for which the acknowledgment needs to be reported. The fourth column indicates the number of ones in the bitmap. The fifth column indicates the decision of the receiver to use the third frame acknowledgment format for the acknowledgment frame 300. The sixth column indicates the size of the BA bitmap field 309 exemplarily illustrated in FIG. 3B when using the third frame acknowledgment format for the acknowledgment frame 300. The seventh column indicates the number of bytes saved, that is, determined by subtracting the size of the BA bitmap field 309 from the size of the bitmap. The eighth column indicates the percentage reduction in the BA bitmap field 309 of the acknowledgment frame 300 in the third frame acknowledgment format. The information in the table exemplarily illustrated in FIG. 9A shows that a significant number of bytes are saved using the third frame acknowledgment format, thereby improving efficiency.

FIG. 9B exemplarily illustrates a table showing the number of bytes saved for different sizes of bitmaps and different bitmap values when the fourth frame acknowledgment format is selected for the acknowledgment frame 300 exemplarily illustrated in FIG. 3A. The first column indicates the size of the bitmap in bytes. The second column indicates arbitrary bitmap values for which the acknowledgment needs to be reported. The third column indicates the size of the BA bitmap field 309 exemplarily illustrated in FIG. 3B, when using the fourth frame acknowledgment format for the acknowledgment frame 300. The fourth column indicates the number of bytes saved, which is determined by subtracting the size of the BA bitmap field 309 from the size of the bitmap. The fifth column indicates the percentage reduction in the BA bitmap field 309 of the acknowledgment frame 300 in the fourth frame acknowledgment format. The information in the table exemplarily illustrated in FIG. 9B shows that a significant number of bytes are saved using the fourth frame acknowledgment format, thereby improving efficiency.

FIG. 10 exemplarily illustrates a system 1000 for acknowledging multiple frames in a communication network 1003. The system 1000 disclosed herein comprises a receiver 1001 that communicates with a transmitter 1004 via the communication network 1003. The receiver 1001 comprises a format determination module 1001a, an acknowledgment frame generation module 1001b, a distance encoder 1001c, and a reporting module 1001d. The receiver 1001 detects transmission of the frames from the transmitter 1004 in the communication network 1003. The receiver 1001 receives frames from the transmitter 1004 in the communication network 1003, for example, via an antenna 1002. The format determination module 1001a determines a format for an acknowledgment frame 300, exemplarily illustrated in FIG. 3A, comprising multiple bytes, from multiple frame acknowledgment formats for reporting the status of reception of the frames. One or more of the frame acknowledgment formats are configured to generate the acknowledgment frame 300 for acknowledging the frames using a decreased number of bytes.

The distance encoder 1001c encodes a distance between a number of frames between two successive correctly received frames, between two successive unsuccessfully received frames, between a correctly received frame and a successive unsuccessfully received frame, or between an unsuccessfully received frame and a successive correctly received frame, in the acknowledgment frame 300. The acknowledgment frame generation module 1001b generates the acknowledgment frame 300 in the determined format for acknowledging the frames using a decreased number of bytes. The generated acknowledgment frame 300 comprises a control field 305 and an information field 306 as disclosed in the detailed description of FIGS. 3A-3C. The BA control field 305 comprises multiple bits that indicate the determined format of the acknowledgment frame 300. The control field 305 further comprises a length subfield 305h, exemplarily illustrated in FIG. 4B, that indicates status of correct reception of the frames by the receiver 1001 or a number of frames acknowledged by the receiver 1001. The BA information field 306 comprises a starting sequence control field 308 that indicates a sequence number of one of the frames that references initiation of the reporting of the status of the reception of the frames, and a bitmap field 309 exemplarily illustrated in FIG. 3B that indicates the status of the reception of the frames.

In an embodiment, the format determination module 1001a determines the correctness of reception of the frames and selects a first frame acknowledgment format for the acknowledgment frame 300 when each of the frames is correctly received by the receiver 1001, and selects a second frame acknowledgment format for the acknowledgment frame 300 when each of the frames is unsuccessfully received as disclosed in the detailed description of FIG. 4B.

In an embodiment, the format determination module 1001a determines a threshold based on the number of frames for which the receiver 1001 needs to report the status of the reception. In an embodiment, the format determination module 1001a determines the format for the acknowledgment frame 300 by determining a number of correctly received frames and a number of unsuccessfully received frames in the frames, when one or more of the frames are correctly received by the receiver 1001 or when one or more of the frames are unsuccessfully received by the receiver 1001. The format determination module 1001a compares the determined number of correctly received frames and the determined number of unsuccessfully received frames with the threshold and selects a third frame acknowledgment format for the acknowledgment frame 300, when the determined number of correctly received frames or the determined number of unsuccessfully received frames is less than or equal to the threshold as disclosed in the detailed description of FIGS. 7A-7B.

The reporting module 1001d reports the unsuccessfully received frames in the acknowledgment frame 300 in the third frame acknowledgment format, when the determined number of unsuccessfully received frames is less than or equal to the threshold. The reporting module 1001d reports the correctly received frames in the acknowledgment frame 300 in the third frame acknowledgment format, when the determined number of correctly received frames is less than or equal to the threshold.

In an embodiment, the format determination module 1001a determines the format for the acknowledgment frame 300 by determining a number of correctly received frames and a number of unsuccessfully received frames in the frames, when one or more of the frames are correctly received by the receiver 1001 or when one or more of the frames are unsuccessfully received by the receiver 1001. The format determination module 1001a compares the determined number of correctly received frames and the determined number of unsuccessfully received frames with the threshold. The format determination module 1001a determines a number of bytes required for the reporting of the status of the reception of the frames when using a fourth frame acknowledgment format for the acknowledgment frame 300, when the determined number of correctly received frames or the determined number of unsuccessfully received frames is greater than the threshold. The format determination module 1001a compares the number of bytes determined when using the fourth frame acknowledgment format with a number of bytes required for reporting the status of the reception of the frames when using a standard format of the frame acknowledgment formats for the acknowledgment frame 300. The format determination module 1001a then selects the fourth frame acknowledgment format or the standard format for the generation of the acknowledgment frame 300 for acknowledging the frames using the decreased number of bytes as disclosed in the detailed description of FIGS. 7A-7B.

In an embodiment, the distance encoder 1001c determines a first distance between a current frame and a successive correctly received frame, where the current frame is at a reference point from where the receiver 1001 determines the first distance and the second distance. The distance encoder 1001c determines a second distance between the current frame and a successive unsuccessfully received frame. The distance encoder 1001c determines a greater distance between the first distance and the second distance and encodes the determined greater distance in the acknowledgment frame 300 in the fourth frame acknowledgment format. The distance encoder 1001c successively changes the reference point to a point one more than the determined greater distance away from the reference point for determining the first distance and the second distance from the successively changed reference point, where a frame at the successively changed reference point is represented as the current frame. That is, the distance encoder 1001c changes the reference point of the current frame to current frame+first distance+1, when the first distance is the determined greater distance. The distance encoder 1001c changes the reference point of the current frame to current frame+second distance+1, when the second distance is the determined greater distance.

The reporting module 1001d terminates the reporting of the status of the reception of the frames when the encoded greater distance is the determined first distance and each of the frames subsequent to the successive correctly received frame is a correctly received frame. The reporting module 1001d terminates the reporting of the status of the reception of the frames when the encoded greater distance is the determined second distance and each the frames subsequent to the successive unsuccessfully received frame is an unsuccessfully received frame.

Figure 11:
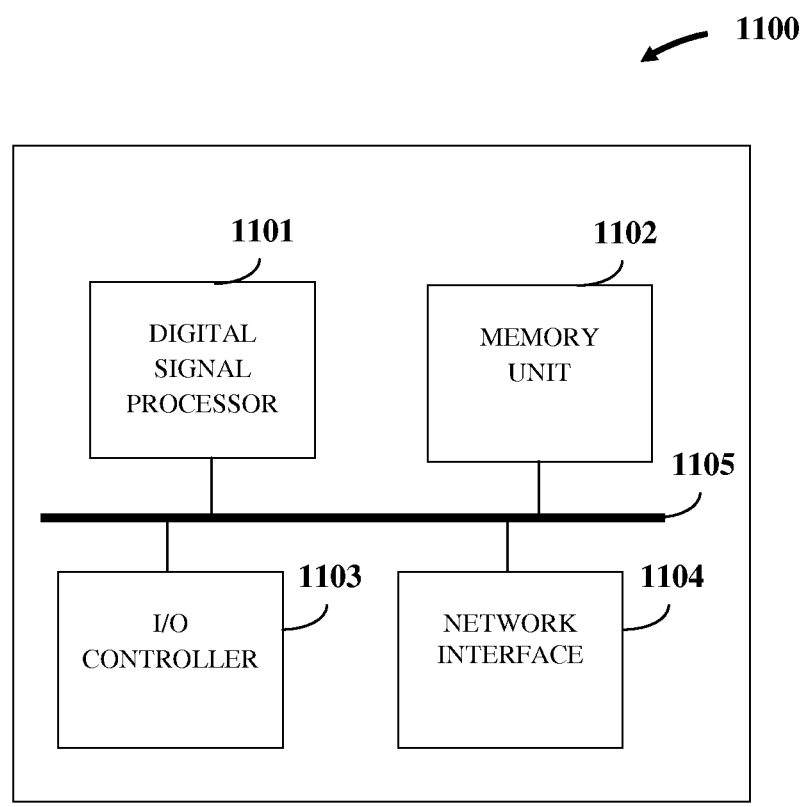
FIG. 11 exemplarily illustrates the architecture of a computing system employed by a receiver for acknowledging multiple frames in a communication network.

FIG. 11 exemplarily illustrates the architecture of a computing system 1100 employed by the receiver 1001 for acknowledging multiple frames in a communication network 1003. The computing system 1100 comprises, for example, a digital signal processor 1101, a memory unit 1102 for storing programs and data, an input/output (I/O) controller 1103, a network interface 1104, a data bus 1105, etc. The computing system 1100 can be implemented in a printed circuit board and incorporated in the receiver 1001.

The digital signal processor 1101 is an electronic circuit that executes instructions and provides data, signals, etc., to be transmitted to the antenna 1002 exemplarily illustrated in FIG. 10. The memory unit 1102 stores programs, applications, and data. For example, the memory unit 1102 stores the format determination module 1001a, the acknowledgment frame generation module 1001b, the distance encoder 1001c, and the reporting module 1001d of the receiver 1001 exemplarily illustrated in FIG. 10. The memory unit 1102 is, for example, a random access memory (RAM) or another type of dynamic storage device that stores information and instructions for execution by the digital signal processor 1101. The memory unit 1102 also stores temporary variables and other intermediate information used during execution of the instructions by the digital signal processor 1101. The computing system 1100 further comprises a read only memory (ROM) or another type of static storage device that stores static information and instructions for the digital signal processor 1101. The network interface 1104 is, for example, a network interface controller that enables the computing system 1100 to connect with the antenna 1002. The receiver 1001 communicates, for example, with the transmitter 1004 through the network interface 1104 via the antenna 1002. The I/O controller 1103 controls input data and output data processed by the receiver 1001. The data bus 1105 permits communication between the modules, for example, 1001a, 1001b, 1001c, and 1001d of the receiver 1001.

The digital signal processor 1101 retrieves the instructions for executing the modules, for example, 1001a, 1001b, 1001c, and 1001d of the receiver 1001 from the memory unit 1102. A program counter determines the location of the instructions in the memory unit 1102. The program counter stores a number that identifies the current position in the program of the modules, for example, 1001a, 1001b, 1001c, and 1001d of the receiver 1001.

The instructions fetched by the digital signal processor 1101 from the memory unit 1102 after being processed are decoded. The instructions are placed in an instruction register (IR) in the digital signal processor 1101. After processing and decoding, the digital signal processor 1101 executes the instructions. For example, the format determination module 1001a defines instructions for determining a format for an acknowledgment frame 300, exemplarily illustrated in FIG. 3A, comprising multiple bytes, from multiple frame acknowledgment formats for reporting status of the reception of the frames as disclosed in the detailed description of FIG. 4B, FIGS. 5-6, and FIGS. 7A-7B. The acknowledgment frame generation module 1001b defines instructions for generating the acknowledgment frame 300 in the determined format for acknowledging the frames. The distance encoder 1001c defines instructions for encoding a distance between a number frames between two successive correctly received frames, between two successive unsuccessfully received frames, between a correctly received frame and a successive unsuccessfully received frame, or between an unsuccessfully received frame and a successive correctly received frame, in the acknowledgment frame 300. In an embodiment, the reporting module 1001d defines instructions for reporting the unsuccessfully received frames in the acknowledgment frame 300 in the third frame acknowledgment format, when the determined number of unsuccessfully received frames is less than or equal to the threshold determined by the receiver

1001. Moreover, the reporting module 1001*d* defines instructions for reporting the correctly received frames in the acknowledgment frame 300 in the third frame acknowledgment format, when the determined number of correctly received frames is less than or equal to the determined threshold. Furthermore, the reporting module 1001*d* defines instructions for terminating reporting of the status of the reception of the frames in conditions as disclosed in the detailed description of FIGS. 8A-8C and FIG. 10.

The digital signal processor 1101 of the receiver 1001 retrieves the instructions defined by the format determination module 1001*a*, the acknowledgment frame generation module 1001*b*, the distance encoder 1001*c*, and the reporting module 1001*d* and executes the instructions. At the time of execution, the instructions stored in the instruction register are examined to determine the operations to be performed. The operations include arithmetic and logic operations. The digital signal processor 1101 then performs the specified operations.

Disclosed herein also is a computer program product comprising computer executable instructions embodied in a non-transitory computer readable storage medium. As used herein, the term "non-transitory computer readable storage medium" refers to all computer readable media, for example, non-volatile media such as optical disks or magnetic disks, volatile media such as a register memory, processor cache, etc., and transmission media such as wires that constitute a system bus coupled to the digital signal processor 1101, except for a transitory, propagating signal.

The computer program product disclosed herein comprises one or more computer program codes for acknowledging multiple frames in a communication network 1003 using a decreased number of bytes. For example, the computer program product disclosed herein comprises a first computer program code for detecting transmission of multiple frames from the transmitter 1004 by the receiver 1001 in the communication network 1003; a second computer program code for determining a format for an acknowledgment frame 300 comprising multiple bytes, from multiple frame acknowledgment formats for reporting status of reception of multiple frames by the receiver 1001; a third computer program code for generating the acknowledgment frame 300 in the determined format by the receiver 1001 for acknowledging the frames; a fourth computer program code for encoding a distance between a number frames between two successive correctly received frames, between two successive unsuccessfully received frames, between a correctly received frame and a successive unsuccessfully received frame, or between an unsuccessfully received frame and a successive correctly received frame, in the acknowledgment frame 300 by the receiver 1001; and a fifth computer program code for determining a threshold based on number of frames that the receiver 1001 needs to acknowledge. The computer program product disclosed herein further comprises additional computer program codes for performing additional steps that may be required and contemplated for acknowledging multiple frames in the communication network 1003 using a decreased number of bytes.

The computer program codes comprising the computer executable instructions for acknowledging multiple frames in the communication network 1003 are embodied on the non-transitory computer readable storage medium. The digital signal processor 1101 of the computing system 1100 retrieves these computer executable instructions and executes them. When the computer executable instructions are executed by the digital signal processor 1101, the computer executable instructions cause the digital signal processor 1101 to perform the method steps for acknowledging multiple frames in the communication network 1003. In an embodiment, a single piece of computer program code comprising computer executable instructions performs one or more steps of the method disclosed herein for acknowledging multiple frames in the communication network 1003.

The present invention can be configured to work in a network environment including a computer that is in communication with one or more devices via a communication network 1003. The computer may communicate with the devices directly or indirectly, via a wired medium or a wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, Sun® processors, IBM® processors, etc., that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and selects, such as are within the scope of the appended claims. Those skilled in the art, having the benefit of the teachings of this specification, may affect numerous modifications thereto and changes may be made without departing from the scope and spirit of the invention in its aspects.

I claim:

1. A method for acknowledging a plurality of frames in a communication network, comprising:
    detecting transmission of said frames from a transmitter by a receiver in said communication network;
    determining a format for an acknowledgment frame comprising a plurality of bytes, from a plurality of frame acknowledgment formats for reporting status of reception of said frames by said receiver, wherein said reporting of said status of said reception of said frames by said receiver comprises encoding a distance between a number of frames between one of two successive correctly received frames of said frames, two successive unsuccessfully received frames of said frames, a correctly received frame of said frames and a successive unsuccessfully received frame of said frames, and an unsuccessfully received frame of said frames and a successive correctly received frame of said frames, in said acknowledgment frame by said receiver, and wherein one or more of said frame acknowledgment formats are configured to generate said acknowledgment frame for acknowledging said frames using a decreased number of said bytes; and
    generating said acknowledgment frame in said determined format by said receiver for acknowledging said frames.

2. The method of claim 1, wherein said generated acknowledgment frame comprises:
    a control field comprising a plurality of bits for indicating said determined format of said acknowledgment frame, wherein said control field further comprises a length subfield for indicating one of status of correct reception of said frames by said receiver and a number of said frames acknowledged by said receiver; and an information field comprising:
- a starting sequence control field for indicating a sequence number of one of said frames that references initiation of said reporting of said status of said reception of said frames; and
- a bitmap field for indicating said status of said reception of said frames.

3. The method of claim 1, wherein said determination of said format for said acknowledgment frame by said receiver comprises determining correctness of said reception of said frames and selecting a first of said frame acknowledgment formats for said acknowledgment frame when each of said frames is correctly received by said receiver.

4. The method of claim 3, wherein said acknowledgment frame in said first of said frame acknowledgment formats comprises a control field and an information field, wherein said control field comprises a length subfield that indicates status of correct reception of said frames by said receiver as zero, and wherein said information field comprises only a starting sequence control field that indicates that each of said frames with a sequence number less than a sequence number indicated in said starting sequence control field is correctly received by said receiver.

5. The method of claim 1, wherein said determination of said format for said acknowledgment frame by said receiver comprises determining correctness of said reception of said frames and selecting a second of said frame acknowledgment formats for said acknowledgment frame when each of said frames with a sequence number greater than or equal to a sequence number of one of said frames that references initiation of said reporting of said status of said reception of said frames, is unsuccessfully received by said receiver.

6. The method of claim 5, wherein said acknowledgment frame in said second of said frame acknowledgment formats comprises a control field and an information field, wherein said information field comprises only a starting sequence control field that indicates said sequence number of said one of said frames that references said initiation of said reporting of said status of said reception of said frames, and wherein said control field comprises a length subfield that indicates a number of said unsuccessfully received frames that have a sequence number greater than said sequence number indicated in said starting sequence control field.

7. The method of claim 1, further comprising determining a threshold by said receiver based on a number of said frames for which said receiver needs to report said status of said reception.

8. The method of claim 1, wherein said determination of said format for said acknowledgment frame by said receiver comprises:
- determining a number of correctly received frames in said frames and a number of unsuccessfully received frames in said frames, when one of one or more of said frames are correctly received by said receiver and one or more of said frames are unsuccessfully received by said receiver; and
- comparing said determined number of correctly received frames and said determined number of unsuccessfully received frames with a threshold and selecting a third of said frame acknowledgment formats for said acknowledgment frame when one of said determined number of correctly received frames and said determined number of unsuccessfully received frames is one of less than and equal to said threshold.

9. The method of claim 8, wherein said third of said frame acknowledgment formats for said acknowledgment frame comprises multiple repeatable 7-bit structures, wherein each of said 7-bit structures comprises a 5-bit subfield, a first 1-bit flag field, and a second 1-bit flag field.

10. The method of claim 8, further comprising:
- reporting said unsuccessfully received frames in said acknowledgment frame in said third of said frame acknowledgment formats by said receiver, when said determined number of said unsuccessfully received frames is one of less than and equal to said threshold; and
- reporting said correctly received frames in said acknowledgment frame in said third of said frame acknowledgment formats by said receiver, when said determined number of said correctly received frames is one of less than and equal to said threshold.

11. The method of claim 1, wherein said determination of said format for said acknowledgment frame by said receiver comprises:
- determining a number of correctly received frames in said frames and a number of unsuccessfully received frames in said frames, when one of one or more of said frames are correctly received by said receiver and one or more of said frames are unsuccessfully received by said receiver;
- comparing said determined number of correctly received frames and said determined number of unsuccessfully received frames with a threshold;
- determining a number of bytes required for said reporting of said status of said reception of said frames when using a fourth of said frame acknowledgment formats for said acknowledgment frame, when one of said determined number of said correctly received frames and said determined number of said unsuccessfully received frames is greater than said threshold;
- comparing said number of bytes determined when using said fourth of said frame acknowledgment formats with a number of bytes required for said reporting of said status of said reception of said frames when using a standard format of said frame acknowledgment formats for said acknowledgment frame; and
- selecting one of said fourth of said frame acknowledgment formats and said standard format of said frame acknowledgment formats for said generation of said acknowledgment frame for acknowledging said frames using said decreased number of said bytes.

12. The method of claim 11, wherein said fourth of said frame acknowledgment formats for said acknowledgment frame comprises multiple repeatable 8-bit structures, wherein each of said 8-bit structures comprises a 5-bit subfield, a first 1-bit flag field, a second 1-bit flag field, and a third 1-bit flag field.

13. The method of claim 11, wherein said receiver acknowledges said plurality of said frames with said decreased number of bytes using said acknowledgment frame in said fourth of said frame acknowledgment formats by:
- determining a first distance between a current frame of said frames and a successive correctly received frame of said frames, wherein said current frame is at a reference point from where said receiver determines said first distance and a second distance;
- determining said second distance between said current frame and a successive unsuccessfully received frame of said frames;
- determining a greater distance between said first distance and said second distance; and encoding said determined greater distance in said acknowledgment frame in said fourth of said frame acknowledgment formats.

14. The method of claim 13, further comprising successively changing said reference point to a point one more than said determined greater distance away from said reference point by said receiver for determining said first distance and said second distance from said successively changed reference point, wherein a frame of said frames at said successively changed reference point is represented as said current frame.

15. The method of claim 13, further comprising:
terminating said reporting of said status of said reception of said frames by said receiver when said encoded greater distance is said determined first distance and each of said frames subsequent to said successive correctly received frame is a correctly received frame; and
terminating said reporting of said status of said reception of said frames by said receiver when said encoded greater distance is said determined second distance and each of said frames subsequent to said successive unsuccessfully received frame is an unsuccessfully received frame.

16. A system for acknowledging a plurality of frames in a communication network, comprising:
a receiver that detects transmission of said frames from a transmitter in said communication network, wherein said receiver comprises:
a format determination module that determines a format for an acknowledgment frame comprising a plurality of bytes, from a plurality of frame acknowledgment formats for reporting status of reception of said frames by said receiver, wherein one or more of said frame acknowledgment formats are configured by said receiver to generate said acknowledgment frame for acknowledging said frames using a decreased number of said bytes;
a distance encoder that encodes a distance between a number of frames between one of two successive correctly received frames of said frames, two successive unsuccessfully received frames of said frames, a correctly received frame of said frames and a successive unsuccessfully received frame of said frames, and an unsuccessfully received frame of said frames and a successive correctly received frame of said frames, in said acknowledgment frame; and
an acknowledgment frame generation module that generates said acknowledgment frame in said determined format for acknowledging said frames.

17. The system of claim 16, wherein said generated acknowledgment frame comprises:
a control field comprising a plurality of bits that indicates said determined format of said acknowledgment frame, wherein said control field further comprises a length subfield that indicates one of status of correct reception of said frames by said receiver and a number of said frames acknowledged by said receiver; and
an information field comprising:
a starting sequence control field that indicates a sequence number of one of said frames that references initiation of said reporting of said status of said reception of said frames; and
a bitmap field that indicates said status of said reception of said frames.

18. The system of claim 16, wherein said format determination module determines correctness of said reception of said frames, wherein said format determination module selects a first of said frame acknowledgment formats for said acknowledgment frame when each of said frames is correctly received by said receiver, and selects a second of said frame acknowledgment formats for said acknowledgment frame when each of said frames with a sequence number greater than or equal to a sequence number of one of said frames that references initiation of said reporting of said status of said reception of said frames is unsuccessfully received by said receiver.

19. The system of claim 18, wherein said acknowledgment frame in said first of said frame acknowledgment formats comprises a control field and an information field, wherein said control field comprises a length subfield that indicates status of correct reception of said frames by said receiver as zero, and wherein said information field comprises only a starting sequence control field that indicates that each of said frames with a sequence number less than a sequence number indicated in said starting sequence control field is correctly received by said receiver.

20. The system of claim 18, wherein said acknowledgment frame in said second of said frame acknowledgment formats comprises a control field and an information field, wherein said information field comprises only a starting sequence control field that indicates said sequence number of said one of said frames that references said initiation of said reporting of said status of said reception of said frames, and wherein said control field comprises a length subfield that indicates a number of said unsuccessfully received frames that have a sequence number greater than said sequence number indicated in said starting sequence control field.

21. The system of claim 16, wherein said format determination module determines a threshold based on a number of said frames for which said receiver needs to report said status of said reception.

22. The system of claim 16, wherein said format determination module determines said format for said acknowledgment frame by:
determining a number of correctly received frames in said frames and a number of unsuccessfully received frames in said frames, when one of one or more of said frames are correctly received by said receiver and one or more of said frames are unsuccessfully received by said receiver; and
comparing said determined number of correctly received frames and said determined number of unsuccessfully received frames with a threshold and selecting a third of said frame acknowledgment formats for said acknowledgment frame when one of said determined number of correctly received frames and said determined number of unsuccessfully received frames is one of less than and equal to said threshold.

23. The system of claim 22, wherein said third of said frame acknowledgment formats for said acknowledgment frame comprises multiple repeatable 7-bit structures, wherein each of said 7-bit structures comprises a 5-bit subfield, a first 1-bit flag field, and a second 1-bit flag field.

24. The system of claim 22, wherein said receiver further comprises a reporting module that performs:
reporting said unsuccessfully received frames in said acknowledgment frame in said third of said frame acknowledgment formats, when said determined number of said unsuccessfully received frames is one of less than and equal to said threshold; and
reporting said correctly received frames in said acknowledgment frame in said third of said frame acknowledgment formats, when said determined number of said correctly received frames is one of less than and equal to said threshold.

25. The system of claim 16, wherein said format determination module determines said format for said acknowledgment frame by:
- determining a number of correctly received frames in said frames and a number of unsuccessfully received frames in said frames, when one of one or more of said frames are correctly received by said receiver and one or more of said frames are unsuccessfully received by said receiver;
- comparing said determined number of correctly received frames and said determined number of unsuccessfully received frames with a threshold;
- determining a number of bytes required for said reporting of said status of said reception of said frames when using a fourth of said frame acknowledgment formats for said acknowledgment frame, when one of said determined number of said correctly received frames and said determined number of said unsuccessfully received frames is greater than said threshold;
- comparing said number of bytes determined when using said fourth of said frame acknowledgment formats with a number of bytes required for said reporting of said status of said reception of said frames when using a standard format of said frame acknowledgment formats for said acknowledgment frame; and
- selecting one of said fourth of said frame acknowledgment formats and said standard format of said frame acknowledgment formats for said generation of said acknowledgment frame for acknowledging said frames using said decreased number of said bytes.

26. The system of claim 25, wherein said fourth of said frame acknowledgment formats for said acknowledgment frame comprises multiple repeatable 8-bit structures, wherein each of said 8-bit structures comprises a 5-bit subfield, a first 1-bit flag field, a second 1-bit flag field, and a third 1-bit flag field.

27. The system of claim 25, wherein said receiver further comprises a distance encoder that performs:
- determining a first distance between a current frame of said frames and a successive correctly received frame of said frames, wherein said current frame is at a reference point from where said receiver determines said first distance and a second distance;
- determining said second distance between said current frame and a successive unsuccessfully received frame of said frames;
- determining a greater distance between said first distance and said second distance; and
- encoding said determined greater distance in said acknowledgment frame in said fourth of said frame acknowledgment formats.

28. The system of claim 27, wherein said distance encoder successively changes said reference point to a point one more than said determined greater distance away from said reference point for determining said first distance and said second distance from said successively changed reference point, wherein a frame of said frames at said successively changed reference point is represented as said current frame.

29. The system of claim 27, wherein said receiver further comprises a reporting module that performs:
- terminating said reporting of said status of said reception of said frames when said encoded greater distance is said determined first distance and each of said frames subsequent to said successive correctly received frame is a correctly received frame; and
- terminating said reporting of said status of said reception of said frames when said encoded greater distance is said determined second distance and each said frames subsequent to said successive unsuccessfully received frame is an unsuccessfully received frame.

30. A computer program product comprising computer executable instructions embodied in a non-transitory computer readable storage medium, wherein said computer program product comprises:
- a first computer program code for detecting transmission of a plurality of frames from a transmitter by a receiver in a communication network;
- a second computer program code for determining a format for an acknowledgment frame comprising a plurality of bytes, from a plurality of frame acknowledgment formats for reporting status of reception of said frames by said receiver, wherein one or more of said frame acknowledgment formats are configured to generate said acknowledgment frame for acknowledging said frames using a decreased number of said bytes;
- a third computer program code for generating said acknowledgment frame in said determined format by said receiver for acknowledging said frames; and
- a fourth computer program code for encoding a distance between a number of frames between one of two successive correctly received frames of said frames, two successive unsuccessfully received frames of said frames, a correctly received frame of said frames and a successive unsuccessfully received frame of said frames, and an unsuccessfully received frame of said frames and a successive correctly received frame of said frames, in said acknowledgment frame by said receiver.

* * * * *